United States Patent
Fujimoto

(10) Patent No.: US 8,199,411 B2
(45) Date of Patent: Jun. 12, 2012

(54) IMAGING LENS, OPTICAL APPARATUS EQUIPPED THEREWITH AND METHOD FOR MANUFACTURING THE IMAGING LENS

(75) Inventor: Makoto Fujimoto, Tokyo (JP)

(73) Assignee: Nikon Corporation, Tokyo (JP)

( * ) Notice: Subject to any disclaimer, the term of this patent is extended or adjusted under 35 U.S.C. 154(b) by 293 days.

(21) Appl. No.: 12/713,714

(22) Filed: Feb. 26, 2010

(65) Prior Publication Data

US 2010/0238560 A1    Sep. 23, 2010

(30) Foreign Application Priority Data

Mar. 17, 2009  (JP) ................................. 2009-064521

(51) Int. Cl.
*G02B 15/14* (2006.01)
(52) U.S. Cl. .......................... 359/680; 359/683; 359/686
(58) Field of Classification Search .......... 359/680–682, 359/686, 749–753
See application file for complete search history.

(56) References Cited

U.S. PATENT DOCUMENTS

| | | | |
|---|---|---|---|
| 5,774,267 A | 6/1998 | Kodama et al. | |
| 5,847,875 A | 12/1998 | Kodama et al. | |
| 6,320,698 B1 | 11/2001 | Suzuki | |
| 6,618,198 B1 | 9/2003 | Endo | |
| 2009/0002844 A1* | 1/2009 | Ito et al. | 359/686 |
| 2009/0091840 A1* | 4/2009 | Ikeda | 359/682 |
| 2011/0194191 A1* | 8/2011 | Shibata et al. | 359/680 |

FOREIGN PATENT DOCUMENTS

| | | |
|---|---|---|
| JP | 7-152002 A | 6/1995 |
| JP | 9-113808 A | 5/1997 |
| JP | 9-230242 A | 9/1997 |
| JP | 11-174329 A | 7/1999 |
| JP | 11-231220 A | 8/1999 |
| JP | 2004-061910 A | 2/2004 |

* cited by examiner

*Primary Examiner* — Jordan Schwartz
(74) *Attorney, Agent, or Firm* — Miles & Stockbridge P.C.

(57) ABSTRACT

An imaging lens SL installed in an SLR camera includes a front group disposed to the most object side and having negative power, and a rear group disposed to an image side of the front group and having negative power. At least a portion of the rear group is movable perpendicularly to an optical axis. The rear group includes a first negative component having negative power, a second negative component having negative power, and a positive component having positive power. The second negative component is disposed between the first negative component and the positive component. The second negative component side surface of the first negative component faces the second negative component, and the second negative component having a negative meniscus shape with a concave surface facing the first negative component. Thereby providing an imaging lens having excellent optical performance, an optical apparatus equipped therewith, and a method for manufacturing thereof.

9 Claims, 18 Drawing Sheets

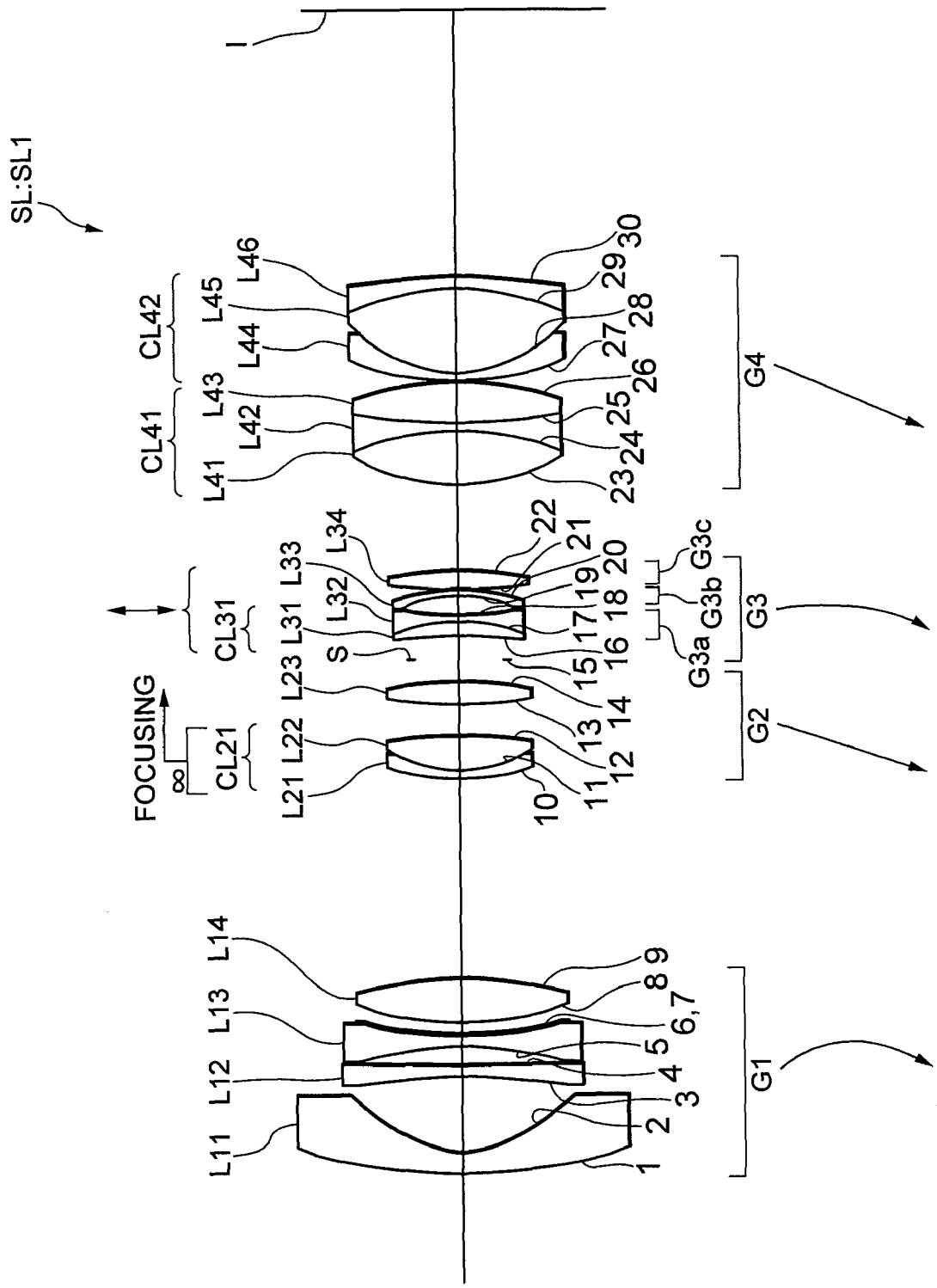

FIG. 4A
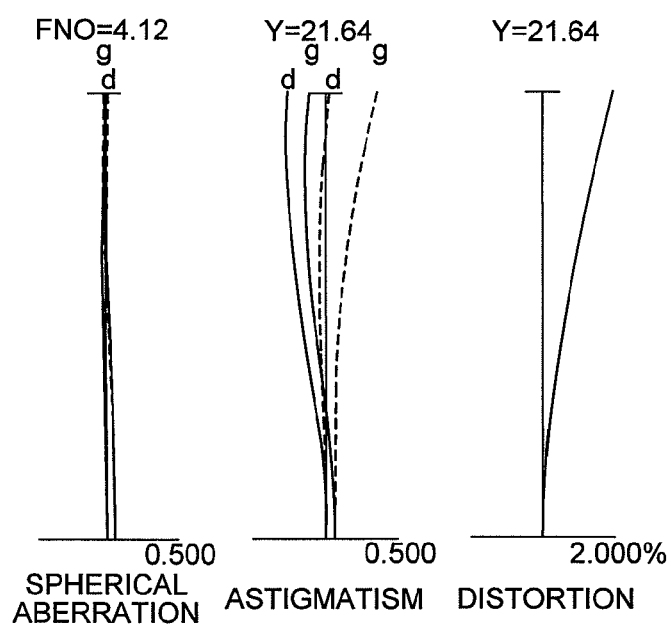
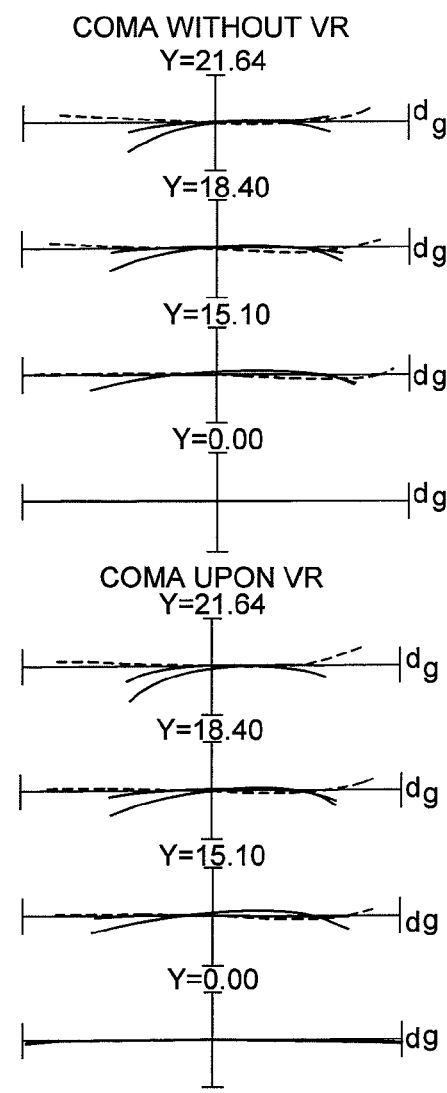
FIG. 4B

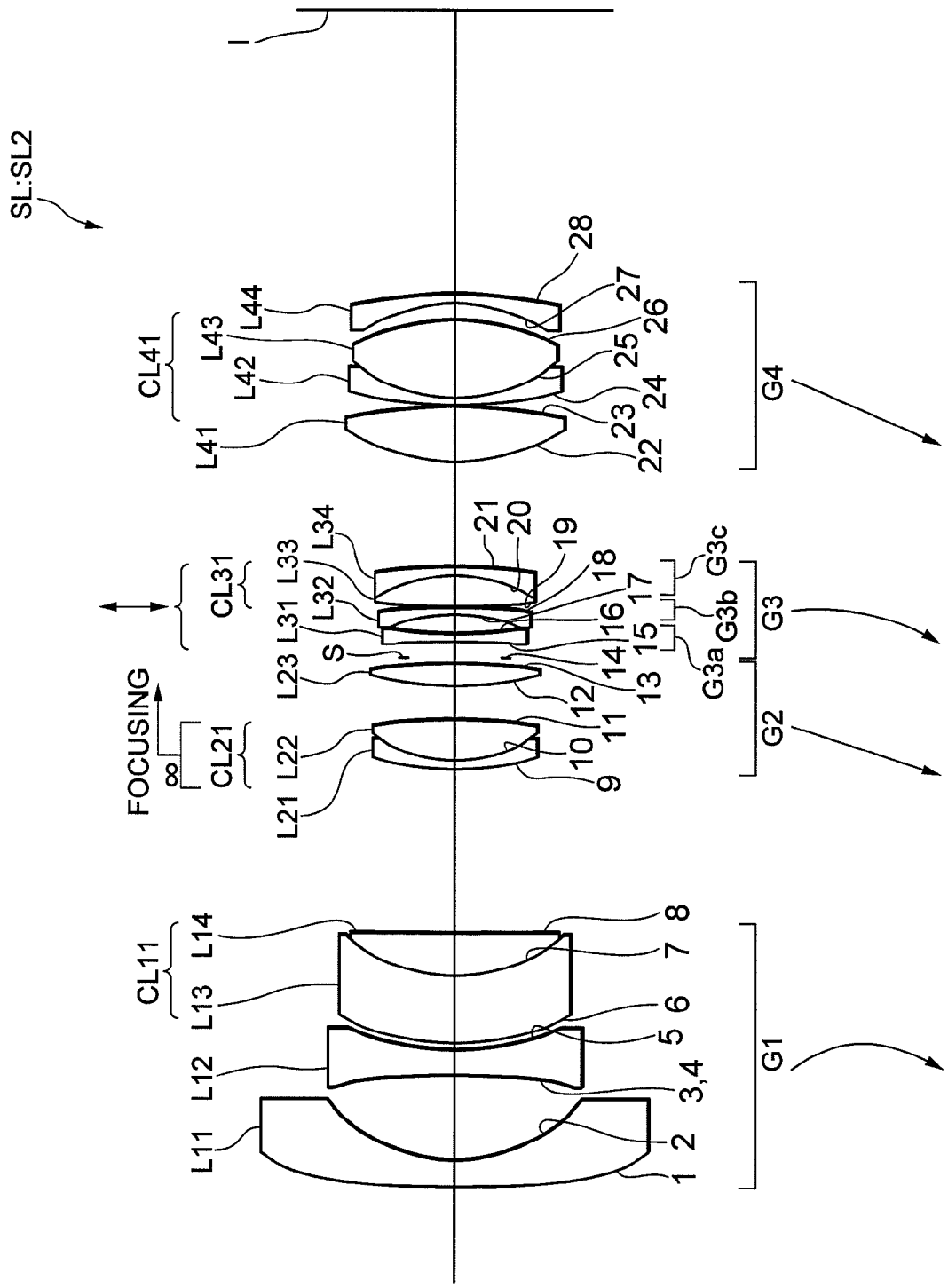

FIG. 15A
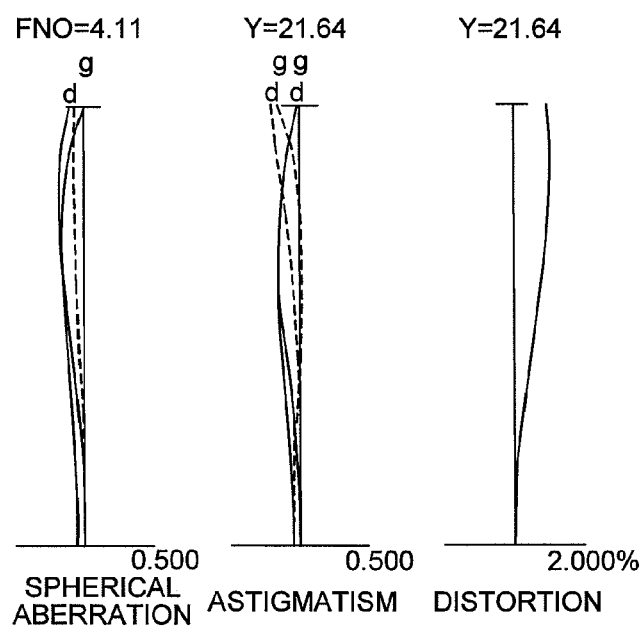
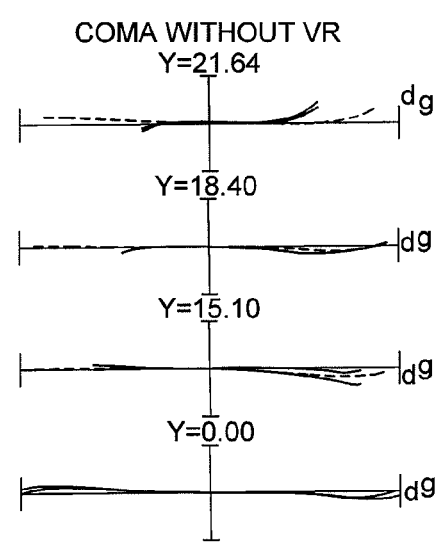
FIG. 15B
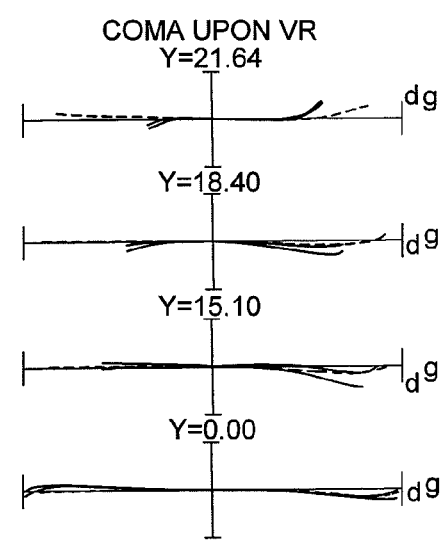

IMAGING LENS, OPTICAL APPARATUS EQUIPPED THEREWITH AND METHOD FOR MANUFACTURING THE IMAGING LENS

The disclosure of the following priority application is herein incorporated by reference:
Japanese Patent Application No. 2009-064521 filed on Mar. 17, 2009.

BACKGROUND OF THE INVENTION

1. Field of the Invention

The present invention relates to an imaging lens, an optical apparatus equipped with the imaging lens, and a method for manufacturing the imaging lens.

2. Related Background Art

There have been proposed a zoom lens suitable for wide-angle photography, having a first lens group with negative refractive power, and having a vibration reduction function disclosed in such as a Japanese Patent Application Laid-Open No. 7-152002. The zoom lens obtains excellent vibration reduction performance with using the third lens group having negative refractive power as a vibration reduction lens group.

However, an imaging lens capable of taking a wide-angle picture with better optical performance than a conventional zoom lens has been desired.

SUMMARY OF THE INVENTION

The present invention is made in view of the above-described desire, and has an object to provide an imaging lens capable of accomplish better optical performance, an optical apparatus equipped with the imaging lens, and a method for manufacturing the imaging lens.

According to a first aspect of the present invention, there is provided an imaging lens comprising: a front lens group that is disposed to the most object side and has negative refractive power; a rear lens group that is disposed to an image side of the front lens group and has negative refractive power; wherein at least a portion of the rear lens group is movable in a direction including a component substantially perpendicular to an optical axis, the rear lens group including a first negative lens component having negative refractive power, a second negative lens component having negative refractive power, and a positive lens component having positive refractive power, the second negative lens component being disposed between the first negative lens component and the positive lens component, the second negative lens component side lens surface of the first negative lens component being formed to be a concave shape facing the second negative lens component side, and the second negative lens component having a negative meniscus shape with a concave surface facing the first negative lens component side.

In the first aspect of the present invention, it is preferable that an aperture stop is disposed in the vicinity of the rear lens group, and the rear lens group is composed of, in order from the aperture stop side, the first negative lens component, the second negative lens component, and the positive lens component.

In the first aspect of the present invention, it is preferable that the positive lens component has a double convex shape.

In the first aspect of the present invention, it is preferable that at least one of the first negative lens component, the second negative lens component and the positive lens component is a cemented lens constructed by a negative lens cemented with a positive lens, and a cemented surface of the cemented lens has a concave surface facing the aperture stop side.

In the first aspect of the present invention, the imaging lens preferably further comprises: a second lens group that has positive refractive power and is disposed between the first lens group which is the front lens group and the third lens group which is the rear lens group; and a fourth lens group that has positive refractive power and is disposed to the image side of the third lens group; wherein upon zooming from a wide-angle end state to a telephoto end state, a distance between the first lens group and the second lens group varies, a distance between the second lens group and the third lens group varies, and a distance between the third lens group and the fourth lens group varies.

In the first aspect of the present invention, it is preferable that upon zooming from a wide-angle end state to a telephoto end state, the distance between the first lens group and the second lens group decreases, the distance between the second lens group and the third lens group increases, and the distance between the third lens group and the fourth lens group decreases.

According to a second aspect of the present invention, there is provided an optical apparatus equipped with the imaging lens according to the first aspect for forming an image of an object on a predetermined image plane.

According to a third aspect of the present invention, there is provided a method for manufacturing an imaging lens that includes a front lens group having negative refractive power and a rear lens group having negative refractive power, the method comprising steps of: disposing the front lens group to the most object side; disposing the rear lens group to an image side of the front lens group; disposing a first negative lens component having negative refractive power, a second negative lens component having a negative meniscus shape with negative refractive power, and a positive lens component having positive refractive power into the rear lens group such that the second negative lens component is disposed between the first negative lens component and the positive lens component, and a shape of an air lens between the first negative lens component and the second negative lens component is a double convex shape; and disposing at least a portion of the rear lens group movable in a direction including a component substantially perpendicular to an optical axis.

With configuring an imaging lens, an optical apparatus equipped with the imaging lens, and a method for manufacturing the imaging lens according to the present invention as described above, it becomes possible to obtain an imaging lens capable of taking a wide-angle photograph with higher optical performance.

BRIEF DESCRIPTION OF THE DRAWINGS

FIG. 1 is a sectional view showing a lens configuration of an imaging lens according to Example 1.

FIGS. 2A, and 2B are graphs showing various aberrations of the imaging lens according to Example 1 in a wide-angle end state focusing on infinity, in which FIG. 2A shows various aberrations without vibration reduction, and FIG. 2B shows coma upon carrying out vibration reduction.

FIGS. 3A, and 3B are graphs showing various aberrations of the imaging lens according to Example 1 in an intermediate focal length state focusing on infinity, in which FIG. 3A shows various aberrations without vibration reduction, and FIG. 3B shows coma upon carrying out vibration reduction.

FIGS. 4A, and 4B are graphs showing various aberrations of the imaging lens according to Example 1 in a telephoto end state focusing on infinity, in which FIG. 4A shows various aberrations without vibration reduction, and FIG. 4B shows coma upon carrying out vibration reduction.

FIG. 5 is a sectional view showing a lens configuration of an imaging lens according to Example 2.

FIGS. 6A, and 6B are graphs showing various aberrations of the imaging lens according to Example 2 in a wide-angle end state focusing on infinity, in which FIG. 6A shows various aberrations without vibration reduction, and FIG. 6B shows coma upon carrying out vibration reduction.

FIGS. 7A, and 7B are graphs showing various aberrations of the imaging lens according to Example 2 in an intermediate focal length state focusing on infinity, in which FIG. 7A shows various aberrations without vibration reduction, and FIG. 7B shows coma upon carrying out vibration reduction.

FIGS. 8A, and 8B are graphs showing various aberrations of the imaging lens according to Example 2 in a telephoto end state focusing on infinity, in which FIG. 8A shows various aberrations without vibration reduction, and FIG. 8B shows coma upon carrying out vibration reduction.

FIGS. 10A, and 10B are graphs showing various aberrations of the imaging lens according to Example 3 in a wide-angle end state focusing on infinity, in which FIG. 10A shows various aberrations without vibration reduction, and FIG. 10B shows coma upon carrying out vibration reduction.

FIGS. 11A, and 11B are graphs showing various aberrations of the imaging lens according to Example 3 in an intermediate focal length state focusing on infinity, in which FIG. 11A shows various aberrations without vibration reduction, and FIG. 11B shows coma upon carrying out vibration reduction.

FIGS. 12A, and 12B are graphs showing various aberrations of the imaging lens according to Example 3 in a telephoto end state focusing on infinity, in which FIG. 12A shows various aberrations without vibration reduction, and FIG. 12B shows coma upon carrying out vibration reduction.

FIGS. 14A, and 14B are graphs showing various aberrations of the imaging lens according to Example 4 in a wide-angle end state focusing on infinity, in which FIG. 14A shows various aberrations without vibration reduction, and FIG. 14B shows coma upon carrying out vibration reduction.

FIGS. 15A, and 15B are graphs showing various aberrations of the imaging lens according to Example 4 in an intermediate focal length state focusing on infinity, in which FIG. 15A shows various aberrations without vibration reduction, and FIG. 15B shows coma upon carrying out vibration reduction.

FIGS. 16A, and 16B are graphs showing various aberrations of the imaging lens according to Example 4 in a telephoto end state focusing on infinity, in which FIG. 16A shows various aberrations without vibration reduction, and FIG. 16B shows coma upon carrying out vibration reduction.

DESCRIPTION OF THE MOST PREFERRED EMBODIMENT

Figure 2A:
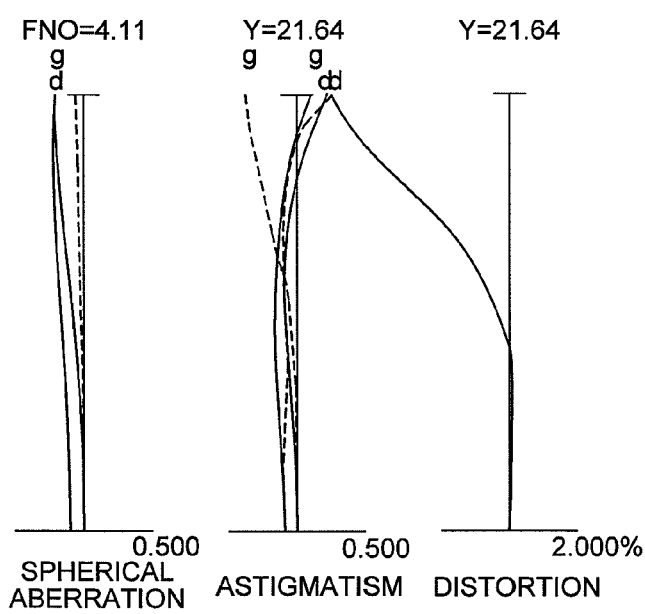

A preferred embodiment according to the present application is explained with reference to accompanying drawings.

As shown in FIG. 1, an imaging lens SL according to the present embodiment is composed of, in order from an object side, a first lens group G1 having negative refractive power that is a front lens group, a second lens group G2 having positive refractive power, a third lens group G3 having negative refractive power that is a rear lens group, and a fourth lens group G4 having positive refractive power. Upon zooming from a wide-angle end state (the shortest focal length state) to a telephoto end state (the longest focal length state), each lens group is moved together along an optical axis and each distance between lens groups varies such that a distance between the first lens group G1 and the second lens group G2 decreases, a distance between the second lens group G2 and the third lens group G3 increases, and a distance between the third lens group G3 and the fourth lens group G4 decreases. With constructing in this manner, the imaging lens SL makes it possible to obtain both of a wide angle of view and excellent vibration reduction performance, so that excellent optical performance can be obtained.

In an imaging lens SL, at least one portion or the entire rear lens group is preferably made to be a vibration reduction lens group capable of moving in a direction having a component substantially perpendicular to an optical axis. Generally in a negative-leading zoom lens having a front lens group having negative refractive power, the front lens group has the largest dimension, so that it sometimes happens that the front lens group is moved forward in the object direction upon focusing. Accordingly, it is not preferable that the front lens group is made to be a vibration reduction lens group because a holding mechanism and a driving mechanism become large and complicated. Moreover, in a lens group other than the front lens group and the rear lens group, when a lens group having a large moving amount in the optical axis direction upon zooming is made to be a vibration lens group, a holding mechanism and a driving mechanism become large and complicated, so that it is undesirable. Since the lens group having positive refractive power disposed between the front lens group and the rear lens group, in particular, tends to generate decentering aberration, when a portion or all of the lens group is made to be a vibration reduction lens group, it becomes difficult to realize high vibration reduction performance, so that it is undesirable. In the rear lens group, the lens diameter thereof can be made relatively small, the moving amount of the rear lens group in the optical axis direction upon zooming can be made smaller than that of the other lens groups. Moreover, the rear lens group can be fixed upon zooming. The rear lens group generates the smallest amount of decentering aberration among the lens groups, so that it is suitable to be the vibration reduction lens group.

In an imaging lens SL, in addition to the above-described configuration, with configuring the rear lens group that is the vibration reduction lens group as shown below, excellent vibration reduction is realized even in extremely high angle of view. In other words, an imaging lens SL preferably has an aperture stop S in the vicinity of the rear lens group. The rear lens group is preferably composed of, in order from the aperture stop S side, a first negative lens component G3a having negative refractive power, a second negative lens component G3b having negative refractive power, and a positive lens component G3c having positive refractive power. Moreover, it is preferable that the second negative lens component G3b side lens surface of the first negative lens component G3a is a concave surface facing the second negative lens component G3b side, and the second negative lens component G3b is a negative meniscus shape having a concave surface facing the first negative lens component G3a side. With this configuration, it becomes possible to prevent the lens group disposed to the image side of the rear lens group from getting large. When the first negative lens component G3a, the second negative lens component G3b and the positive lens component G3c are made to be the vibration reduction lens group, decentering coma, and asymmetric blur of meridional image plane and sagittal image plane generated upon moving the vibration reduction lens group in a direction substantially perpendicular to the optical axis can be minimized. Incidentally, the vibration reduction lens group may be composed of the first negative lens component G3a and the second negative lens component G3b, and the positive lens component G3c may be fixed to a position in a direction substantially perpendicular to the optical axis upon vibration reduction.

With having positive refractive power, the positive lens component G3c has an effect to make a diameter of the lens group disposed to the image side of the rear lens group small. The positive lens component G3c is preferably a single lens having a double convex shape. With this configuration, it becomes possible to minimize decentering coma, and asymmetric blur of meridional image plane and sagittal image plane generated upon moving the vibration reduction lens group in a direction substantially perpendicular to the optical axis.

When all of the first negative lens component G3a, the second negative lens component G3b and the positive lens component G3c are composed of single lenses, chromatic curvature of field tends to be generated in the telephoto end state. With choosing a low dispersion glass material as the lens material, chromatic curvature of field can be suppressed to a certain extent. However, refractive index of the glass material becomes low, so that it becomes a trade-off relationship for decentering coma. Accordingly, in an imaging lens SL, at least one of the first negative lens component G3a, the second negative lens component G3b and the positive lens component G3c is preferably a cemented lens constructed by a negative lens cemented with a positive lens, so that chromatic curvature of field in the telephoto end state can be corrected excellently. Incidentally, although two or more of those lens components may be cemented lenses, in order to lighten the weight, two lens components other than the cemented lens are preferably single lenses.

Furthermore, when one lens component is made to be a cemented lens in this manner, the cemented surface preferably has a concave shape facing the aperture stop S side. With this configuration, it becomes possible to excellently suppress generation of chromatic curvature of field upon vibration reduction.

In an imaging lens SL, although the rear lens group is composed of the first negative lens component G3a, the second negative lens component G3b and the positive lens component G3c, another lens component can be added adjoining to the outside of the first negative lens component G3a or the positive lens component G3c.

In an imaging lens SL, the following conditional expression (1) is preferably satisfied:

$$|r2|<|r1| \quad (1)$$

where r1 denotes a radius of curvature of the second negative lens component G3b side surface of the first negative lens component G3a, and r2 denotes a radius of curvature of the first negative lens component G3a side surface of the second negative lens component G3b.

Conditional expression (1) defines an air lens formed by the first negative lens component G3a and the second negative lens component G3b. In a conventional telephoto type vibration reduction lens group, the radius of curvature has been smaller to the aperture stop side. However, in an imaging lens SL satisfying conditional expression (1), in an air lens formed by the first negative lens component G3a and the second negative lens component G3b, the absolute value of the radius of curvature to the aperture stop side r1 is larger. With satisfying conditional expression (1), it becomes possible to make the vibration reduction lens group suitable configuration for an imaging lens SL having a wide angle of view.

In an imaging lens SL, the following conditional expression (2) is preferably satisfied:

$$0.0<Fa<0.5 \quad (2)$$

where Fa is expressed by the following expression:

$$Fa=(r1+r2)/\max(|r1|,|r2|)$$

where "max( )" is a function that returns the maximum value among a plurality of values in the brackets, r1 denotes a radius of curvature of the second negative lens component G3b side of the first negative lens component G3a, and r2 denotes a radius of curvature of the first negative lens component G3a side of the second negative lens component G3b.

Conditional expression (2) defines an appropriate relation between the radii of curvature r1 and r2 of the air lens formed by the first negative lens component G3a and the second negative lens component G3b. With satisfying conditional expression (2), it becomes possible to make the vibration reduction lens group suitable configuration for an imaging lens SL having a wide angle of view. Moreover, it becomes possible to minimize a tilt of the image plane generated upon moving the vibration reduction lens group in a direction substantially perpendicular to the optical axis.

In an imaging lens SL, the following conditional expression (3) is preferably satisfied:

$$0.5<Fb<2.0 \quad (3)$$

where Fb is expressed by the following expression:

$$Fb=Fg3c/|Fg3|$$

where Fg3 denotes a focal length of the rear lens group that is the vibration reduction lens group, and Fg3c denotes a focal length of the positive lens component G3c.

Conditional expression (3) defines a ratio of a focal length of the positive lens component G3c to a focal length of the rear lens group that is the vibration reduction lens group.

With satisfying conditional expression (3), the vibration reduction lens group makes it possible to prevent the lens group disposed to the image side thereof from getting large with keeping high vibration reduction performance. When the value Fb is equal to or falls below the lower limit of conditional expression (3), although the diameter of the lens group disposed to the image side of the rear lens group becomes small, focal lengths of the first negative lens component G3a and the second negative lens component G3b become relatively small, and vibration reduction performance as well as optical performance become worse, so that it is undesirable. On the other hand, when the value Fb is equal to or exceeds the upper limit of conditional expression (3), the diameter of the lens group disposed to the image side of the rear lens group becomes large, and the vibration reduction lens group becomes unsuited for an imaging lens SL having a wide angle of view, so that it is undesirable.

Figure 17:
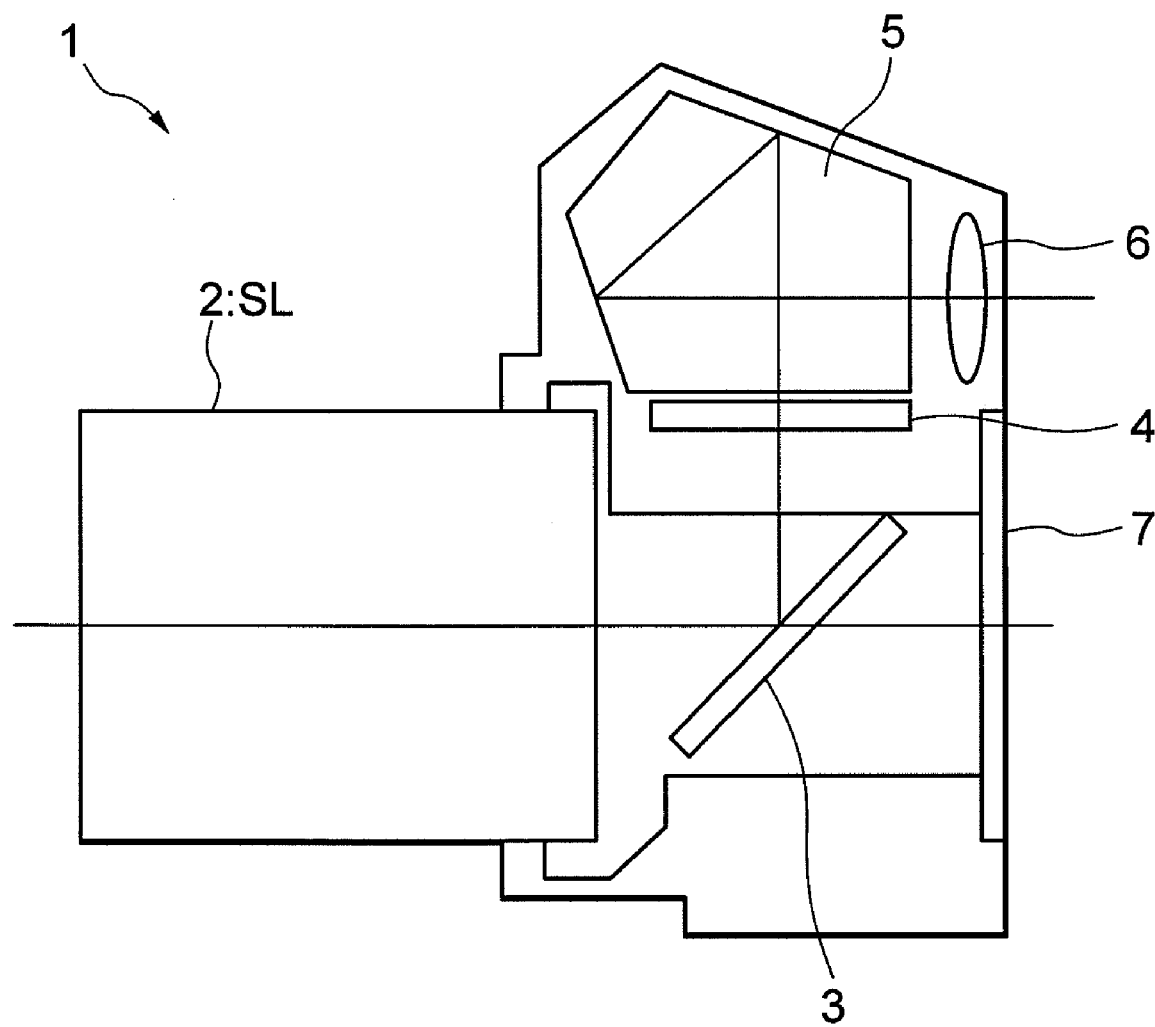
FIG. 17 is a sectional view showing a single-lens reflex digital camera equipped with the imaging lens according to the present embodiment.

In FIG. 17, a sectional view showing a single-lens reflex digital camera (hereinafter simply called as a camera) 1 as an optical apparatus equipped with the imaging lens SL described above is shown. In the camera 1, light coming out from an object (not shown) is converged by an imaging lens 2 (imaging lens SL), reflected by a quick return mirror 3, and focused on a focusing screen 4. The light focused on the focusing screen 4 is reflected a plurality of times by a pentagonal roof prism 5, and led to an eyepiece 6. Accordingly, a photographer can observe the object image as an erected image through the eyepiece 6.

When the photographer presses a release button (not shown) all the way down, the quick return mirror 3 is retracted from the optical path, the light from the object is formed an object image on an imaging device 7. Accordingly, the light coming from the object and converged on the imaging lens 2 is captured by the imaging device 7, and a photographed image is stored in a memory (not shown). In this manner, the photographer can take an image of an object by the camera 1. Incidentally, the camera 1 shown in FIG. 17 may removably hold the imaging lens SL, or may be constructed in a body with the imaging lens SL. The camera 1 may be a so-called single-lens reflex camera, or a compact camera, which does not include a quick return mirror and the like.

Figure 18:
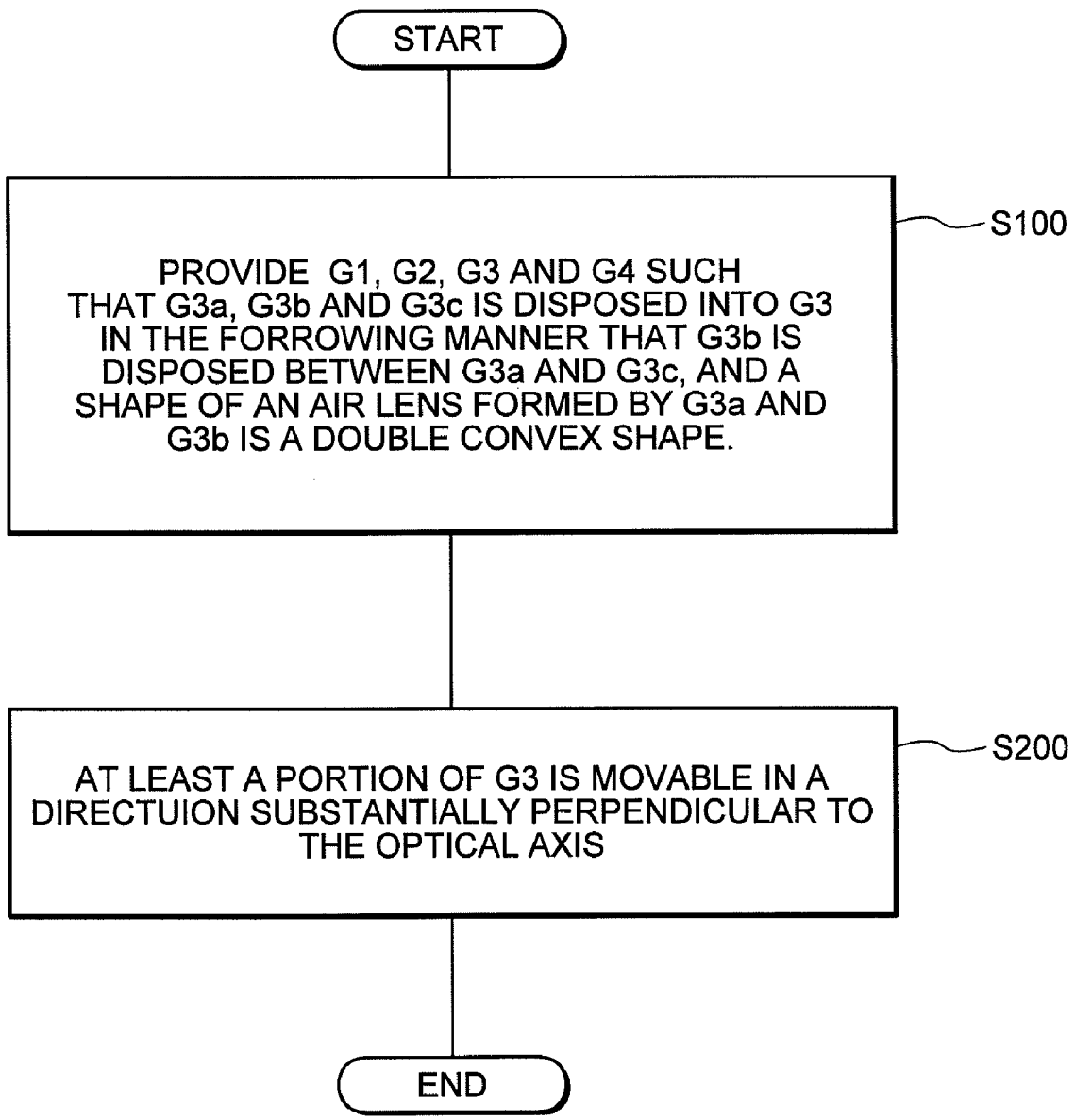
FIG. 18 is a flowchart schematically explaining a method for manufacturing the imaging lens according to the present embodiment.

An outline of a method for manufacturing an imaging lens SL according to the present embodiment is explained below with reference to FIG. 18.

At first, each lens group is provided by disposing each lens (Step S100). In this instance, a first lens group G1 having negative refractive power is disposed to the most object side as a front lens group, a third lens group G3 having negative refractive power is disposed to the image side of the front lens group as a rear lens group, a second lens group G2 having positive refractive power is disposed between the first lens group G1 and the third lens group G3, and a fourth lens group G4 having positive refractive power is disposed to the image side of the third lens group G3. In the third lens group G3, a first negative lens component G3a having negative refractive power, a second negative lens component G3b having a negative meniscus shape with negative refractive power, and a positive lens component G3c having positive refractive power are disposed such that the second negative lens component G3b is disposed between the first negative lens component G3a and the positive lens component G3c, and a shape of an air lens formed by the first negative lens component G3a and the second negative lens component G3b is a double convex shape.

In particular, in the present embodiment, for example, in order from the object side, a negative meniscus lens L11, which has aspherical surfaces on both sides and has a convex surface facing the object side, a double concave negative lens L12, a double concave negative lens L13 having an aspherical surface formed by a resin layer on the image side, and a double convex positive lens L14 are disposed to be the first lens group G1. A cemented lens CL21 constructed by a negative meniscus lens L21 having a convex surface facing the object side cemented with a double convex positive lens L22, and a double convex positive lens L23 are disposed to be the second lens group G2. An aperture stop S, a first negative lens component G3a composed of a cemented lens CL31 constructed by a positive meniscus lens L31 (positive lens) having a concave surface facing the object side cemented with a double concave negative lens L32 (negative lens), a second negative lens component G3b composed of a negative meniscus lens L33 having a concave surface facing the first negative lens component G3a side, and a positive lens component G3c composed of a double convex positive lens L34 are disposed to be the third lens group G3. A triple cemented lens CL41 constructed by a double convex positive lens L41 cemented with a double concave negative lens L42 cemented with a double convex positive lens L43, and a triple cemented lens CL42 constructed by a negative meniscus lens L44 having a convex surface facing the object side cemented with a double convex positive lens L45 cemented with a negative meniscus lens L46 having a concave surface facing the object side and an aspherical surface facing the image side are disposed to be the fourth lens group G4. In this manner, each prepared lens group is disposed to manufacture an imaging lens SL.

In this instance, at least a portion of the third lens group G3 as the rear lens group is disposed movably in a direction including a component substantially perpendicular to the optical axis (Step S200).

Figure 9:
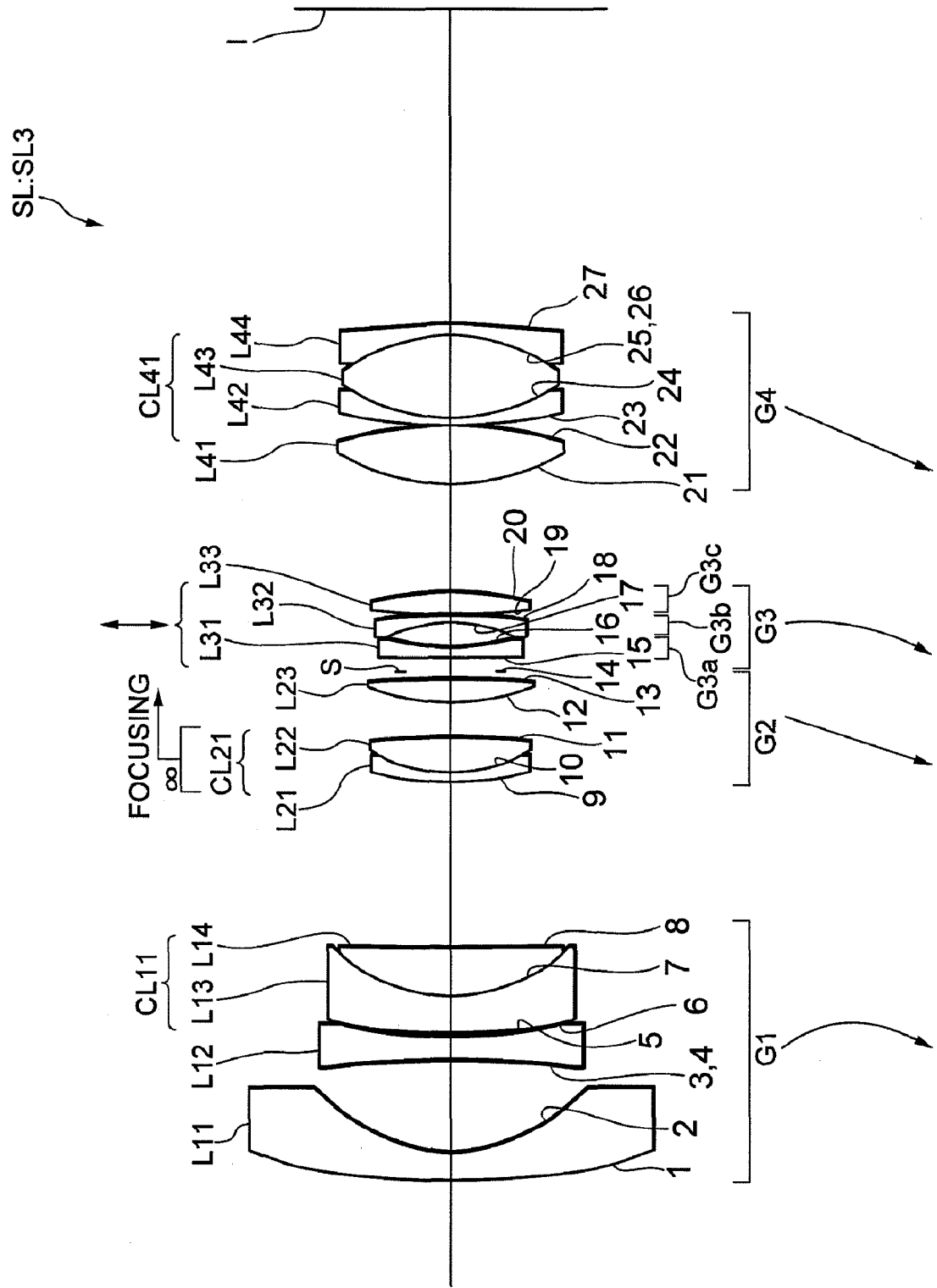
FIG. 9 is a sectional view showing a lens configuration of an imaging lens according to Example 3.

Each example according to present application is explained below with reference to accompanying drawings. Each of FIGS. 1, 5, 9 and 13 is a sectional view showing lens configuration, power distribution, a zoom trajectory of each lens group, in which each lens group moves along the optical axis with following the trajectory shown by an arrow upon zooming to the telephoto end state, of an imaging lens SL (SL1 through SL4) according to each Example. As shown in FIGS. 1, 5 and 9, imaging lenses SL1 through 3 according to Examples 1 through 3 are four-lens-configuration that is composed of, in order from an object side, a first lens group G1 (front lens group) having negative refractive power, a second lens group G2 having positive refractive power, a third lens group G3 (rear lens group) having negative refractive power, and a fourth lens group G4 having positive refractive power. The third lens group G3 is composed of, in order from the object side, an aperture stop S, a first negative lens component G3a having negative refractive power, a second negative lens component G3b having negative refractive power, and a positive lens component G3c having positive refractive power. Upon zooming from a wide-angle end state to a telephoto end state, each distance between lens groups varies such that a distance between the first lens group G1 and the second lens group G2 decreases, a distance between the second lens group G2 and the third lens group G3 increases, and a distance between the third lens group G3 and the fourth lens group G4 decreases. Vibration reduction is carried out by moving lenses included in the third lens group G3 in a direction substantially perpendicular to the optical axis. Incidentally, the aperture stop S of the third lens group G3 is preferably not moved in a direction substantially perpendicular to the optical axis upon vibration reduction.

Figure 13:
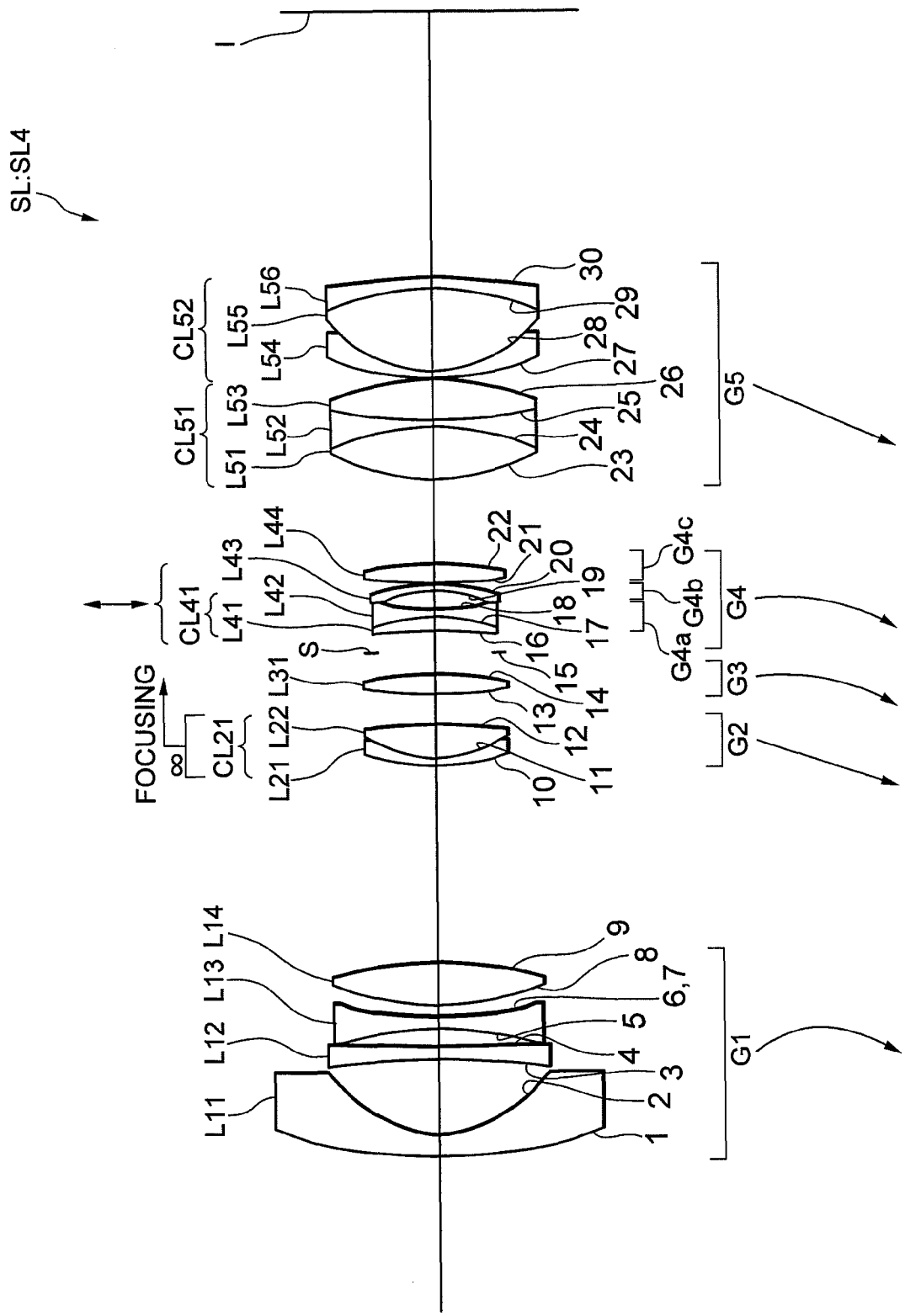
FIG. 13 is a sectional view showing a lens configuration of an imaging lens according to Example 4.

As shown in FIG. 13, an imaging lens SL4 according to Example 4 is a five-lens-group configuration that is, in order from an object side, a first lens group (front lens group) G1 having negative refractive power, a second lens group G2 having positive refractive power, a third lens group G3 having positive refractive power, a fourth lens group (rear lens group) G4 having negative refractive power, and a fifth lens group G5 having positive refractive power. The fourth lens group G4 is composed of, in order from the object side, an aperture stop S, a first negative lens component G4a having negative refractive power, a second negative lens component G4b having negative refractive power, and a positive lens component G4c having positive refractive power. Upon zooming from a wide-angle end state to a telephoto end state, each distance between lens groups varies such that a distance between the first lens group G1 and the second lens group G2 decreases, a distance between the second lens group G2 and the third lens group G3 varies, a distance between the third lens group G3 and the fourth lens group G4 increases, and a distance between the fourth lens group G4 and the fifth lens group G5 decreases. Vibration reduction is carried out by moving lenses included in the fourth lens group G4 in a direction substantially perpendicular to the optical axis. The aperture stop S included in the fourth lens group G4 is preferably not moved in the direction substantially perpendicular to the optical axis upon vibration reduction.

In each Example, an aspherical surface is expressed by the following expression (a):

$$S(y)=(y^2/r)/\{1+(1-\kappa \times y^2/r^2)^{1/2}\}+A3\times|y^3|+A4\times y^4+A5\times|y^5|+A6\times y^6+A7\times|y^7|+A8\times y^8+A9\times|y^9|+A10\times y^{10}+A11\times|y^{11}|+A12\times y^{12} \quad (a)$$

where y denotes a vertical height from the optical axis, S(y) denotes a sag amount which is a distance along the optical axis from the tangent surface at the vertex of the aspherical surface to the aspherical surface at the vertical height y from the optical axis, r denotes a radius of curvature of a reference sphere (paraxial radius of curvature), κ denotes a conical coefficient, and An denotes an aspherical coefficient of n-th order. In the following Examples, "E-n" denotes "×10$^{-n}$", and aspherical coefficient of the second order A2 is zero. In [Lens Data], an aspherical surface is shown by attaching "*" to the left side of the surface number.

Example 1

FIG. 1 is a sectional view showing a lens configuration of an imaging lens SL1 according to Example 1 of the present application. In the imaging lens SL1 according to Example 1, the first lens group G1 is composed of, in order from an object side, a negative meniscus lens L11 that has a convex surface facing the object side and aspherical surfaces on both sides, a double concave negative lens L12, a double concave negative lens L13 having an aspherical surface formed by a resin layer on an image side, and a double convex positive lens L14.

The second lens group G2 is composed of, in order from the object side, a cemented lens CL21 constructed by a negative meniscus lens L21 having a convex surface facing the object side cemented with a double convex positive lens L22, and a double convex positive lens L23. With moving the cemented lens CL21 in the second lens group G2 along the optical axis, focusing from infinity to a nearest distance is carried out. In this manner, with constructing the imaging lens as an internal focusing system, burden on a focusing motor can be lightened, so that quick drive and power saving upon auto focus can be realized.

In the third lens group G3, the first negative lens component G3a is composed of a cemented lens CL31 constructed by, in order from the object side, a positive meniscus lens L31 having a concave surface facing the object side cemented with a double concave negative lens L32. The second negative lens component G3b is composed of a negative meniscus lens L33 having a concave surface facing the first negative lens component G3a side. The positive lens component G3c is composed of a double convex positive lens L34. With moving the third lens group G3 in a direction substantially perpendicular to the optical axis, image blur caused by a vibration of the imaging lens SL1 can be corrected (vibration reduction).

Moreover, the second negative lens component G3b side lens surface of the first negative lens component G3a included in the third lens group G3 is a concave surface facing the second negative lens component G3b. The second negative lens component G3b in the third lens group G3 has a negative meniscus shape having a concave surface facing the first negative lens component G3a side. With this lens configuration, it becomes possible to excellently correct decentering coma and inclination of image plane generated upon moving the vibration reduction lens group in a direction substantially perpendicular to the optical axis.

Furthermore, when the cemented lens CL31 whose cemented surface has a concave shape facing the aperture stop S side is made to be the first negative lens component G3a, chromatic curvature of field, in particular, chromatic curvature of field in the telephoto side can be corrected. In the third lens group G3 that is the vibration reduction lens group, with disposing the positive lens component G3c having positive refractive power to the fourth lens group G4 side, it becomes possible to prevent the diameter of the fourth lens group G4 from getting larger, which is a typical issue for a super wide-angle zoom lens, without deteriorating vibration reduction performance.

The fourth lens group G4 is composed of, in order from the object side, a triple-cemented lens CL41 constructed by a double convex positive lens L41 cemented with a double concave negative lens L42 cemented with a double convex positive lens L43, and a triple-cemented lens CL42 constructed by a negative meniscus lens L44 having a convex surface facing the object side cemented with a double convex positive lens L45 cemented with a negative meniscus lens L46 having a concave surface facing the object side and an aspherical surface facing the image side.

Various values associated with the imaging lens SL1 according to Example 1 are listed in Table 1. In [Specifications], W denotes a wide-angle end state, M denotes an intermediate focal length state, T denotes a telephoto end state, f denotes a focal length of the zoom lens, FNO denotes an f-number, 2ω denotes an angle of view, IH denotes an image height, TL denotes a total lens length that is a distance from the first lens surface to the image plane I upon focusing on infinity. In [Lens Data], the left most column "i" shows the lens surface number counted in order from the object side, the second column "r" shows a radius of curvature of the lens surface, the third column "d" shows a distance to the next surface, the fourth column "nd" shows a refractive index at d-line (wavelength λ=587.6 nm), and the fifth column "vd" shows an Abbe number at d-line (wavelength λ=587.6 nm). In the fourth column "nd" refractive index of the air nd=1.000000 is omitted. In the second column "r", r=∞ denotes a plane surface. In third column "d", Bf denotes a back focal length. In [Lens Group Data], a starting surface number "I" and a focal length of each lens group are shown. In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples. In [Aspherical Surface Data], aspherical coefficients A3, A5, A7, A9 and A11 are zero in Example 1.

TABLE 1

| [Specifications] | | | |
|---|---|---|---|
| | W | M | T |
| f = | 16.48 | 24.00 | 33.94 |
| FNO = | 4.1 | 4.1 | 4.1 |
| 2ω = | 108° | 84° | 63° |
| IH = | 21.64 | 21.64 | 21.64 |
| TL = | 169.18 | 160.72 | 165.24 |

| [Lens Data] | | | | |
|---|---|---|---|---|
| i | r | d | nd | vd |
| *1 | 64.361 | 3.00 | 1.76690 | 46.85 |
| *2 | 14.627 | 11.25 | | |
| 3 | −118.914 | 1.55 | 1.88300 | 40.76 |
| 4 | 261.338 | 2.85 | | |
| 5 | −57.268 | 1.50 | 1.88300 | 40.76 |

TABLE 1-continued

| | | | | |
|---|---|---|---|---|
| 6 | 52.742 | 0.40 | 1.55389 | 38.09 |
| *7 | 96.287 | 1.50 | | |
| 8 | 42.407 | 6.40 | 1.69895 | 30.13 |
| 9 | −65.202 | (d9) | | |
| 10 | 36.176 | 1.05 | 1.84666 | 23.78 |
| 11 | 19.297 | 4.95 | 1.60342 | 38.01 |
| 12 | −121.274 | 4.70 | | |
| 13 | 65.310 | 3.10 | 1.51823 | 58.93 |
| 14 | −65.310 | (d14) | | |
| 15 | ∞ | 3.26 | Aperture Stop S | |
| 16 | −137.621 | 2.10 | 1.70154 | 41.17 |
| 17 | −31.799 | 1.00 | 1.88300 | 40.76 |
| 18 | 35.395 | 2.90 | | |
| 19 | −24.463 | 0.80 | 1.88300 | 40.76 |
| 20 | −40.108 | 0.15 | | |
| 21 | 75.282 | 2.70 | 1.84666 | 23.78 |
| 22 | −61.234 | (d22) | | |
| 23 | 29.863 | 8.00 | 1.49782 | 82.51 |
| 24 | −43.301 | 1.10 | 1.83400 | 37.16 |
| 25 | 75.908 | 5.95 | 1.49782 | 82.51 |
| 26 | −47.092 | 0.15 | | |
| 27 | 39.817 | 1.10 | 1.88300 | 40.76 |
| 28 | 20.500 | 12.15 | 1.48749 | 70.41 |
| 29 | −40.025 | 1.60 | 1.80610 | 40.77 |
| *30 | −72.448 | (Bf) | | |

[Lens Group Data]

| Group | I | focal length |
|---|---|---|
| G1 | 1 | −21.30 |
| G2 | 10 | 34.14 |
| G3 | 15 | −46.90 |
| G4 | 23 | 50.02 |

[Aspherical Surface Data]

Surface Number: 1

$\kappa = 1.000$
$A4 = -8.262E-06$
$A6 = 1.472E-08$
$A8 = -1.057E-11$
$A10 = 7.575E-15$
$A12 = -2.361E-18$ Surface Number: 2

$\kappa = 0.017$
$A4 = -6.389E-06$
$A6 = -3.010E-08$
$A8 = 8.699E-11$
$A10 = 0.000E+00$
$A12 = 0.000E+00$ Surface Number: 7

$\kappa = 8.352$
$A4 = 1.862E-05$
$A6 = 1.672E-08$
$A8 = -3.678E-11$
$A10 = 0.000E+00$
$A12 = 0.000E+00$ Surface Number: 30

$\kappa = 12.401$
$A4 = 1.208E-05$
$A6 = 1.539E-08$
$A8 = -2.918E-11$
$A10 = 1.594E-13$
$A12 = 4.038E-18$

[Variable Distances]

| | W | M | T |
|---|---|---|---|
| f | 16.48 | 23.99 | 33.94 |
| d9 | 28.97 | 11.94 | 2.09 |
| d14 | 3.26 | 6.00 | 8.50 |
| d22 | 12.46 | 5.96 | 1.21 |
| Bf | 38.60 | 50.93 | 67.55 |

[Values for Conditional Expressions]

Fg3 = −46.902
Fg3c = 40.248
(1) r1 = 35.395, r2 = −24.463
(2) Fa = 0.31
(3) Fb = 0.86

Figure 2B:
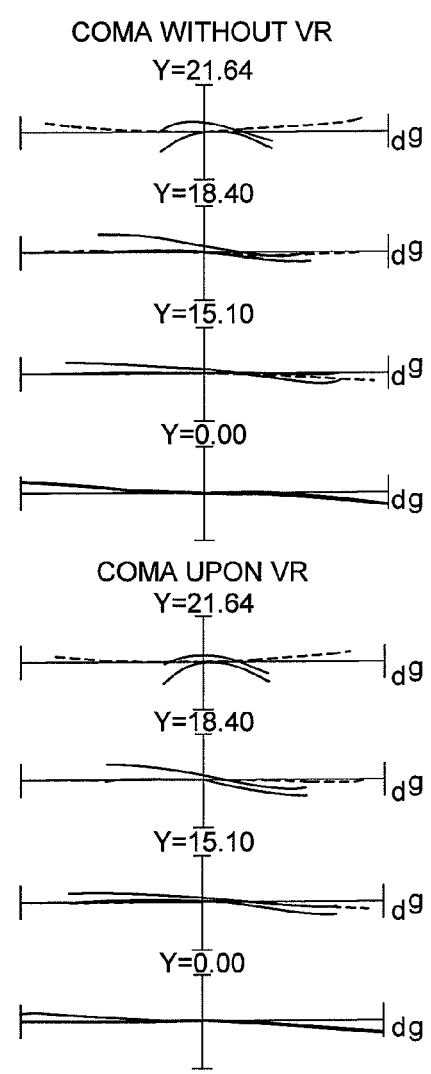
Figures 3A, 3B:
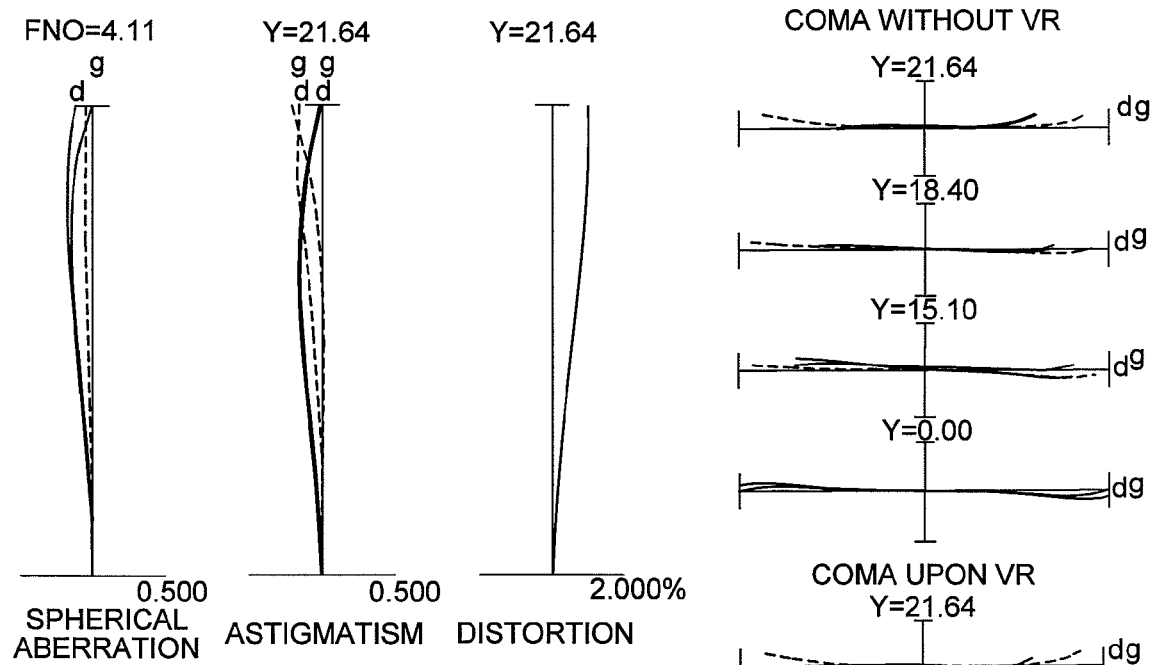

FIGS. 2A, and 2B are graphs showing various aberrations of the imaging lens according to Example 1 in a wide-angle end state focusing on infinity, in which FIG. 2A shows various aberrations without vibration reduction, and FIG. 2B shows coma upon carrying out vibration reduction. FIGS. 3A, and 3B are graphs showing various aberrations of the imaging lens according to Example 1 in an intermediate focal length state focusing on infinity, in which FIG. 3A shows various aberrations without vibration reduction, and FIG. 3B shows coma upon carrying out vibration reduction. FIGS. 4A, and 4B are graphs showing various aberrations of the imaging lens according to Example 1 in a telephoto end state focusing on infinity, in which FIG. 4A shows various aberrations without vibration reduction, and FIG. 4B shows coma upon carrying out vibration reduction. Incidentally, "coma upon vibration reduction" is corresponding to an aberration value when the third lens group G3 is moved by 0.2 mm in a direction substantially perpendicular to the optical axis. In respective graphs, FNO denotes an f-number, Y denotes an image height, A denotes a half angle of view with respect to each image height, d denotes d-line (wavelength λ=587.6 nm), and g denotes g-line (wavelength λ=435.6 nm). In graphs showing astigmatism, a solid line indicates a sagittal image plane, and a broken line indicates a meridional image plane. In graphs showing spherical aberration, a solid line indicates spherical aberration, and a broken line indicates sine condition. The above-described explanations regarding various aberration graphs are the same as the other Examples.

As is apparent from the respective graphs, the imaging lens SL1 according to Example 1 shows superb optical performance as a result of good corrections to various aberrations in each focal length state from the wide-angle end state through the telephoto end state even upon carrying out vibration reduction.

Moreover, Example 1 makes it possible to provide an imaging lens SL1 capable of zooming from a super wide-angle of view of 100 degrees or more to a standard angle of view of about 50 degrees, having high vibration reduction performance capable of excellently correcting aberrations upon vibration reduction, and having superb optical performance.

Example 2

FIG. 5 is a sectional view showing lens configuration of an imaging lens SL2 according to Example 2 of the present application. In the imaging lens SL2 shown in FIG. 5, a first lens group G1 is composed of, in order from an object side, a negative meniscus lens L11 having a convex surface facing the object side and aspherical surfaces on both sides thereof, a double concave negative lens L12 having an aspherical surface formed by a resin layer on the object side, and a cemented lens CL11 constructed by a negative meniscus lens L13 having a convex surface facing the object side cemented with a positive meniscus lens L14 having a convex surface facing the object side.

The second lens group G2 is composed of, in order from the object side, a cemented lens CL21 constructed by a negative meniscus lens L21 having a convex surface facing the object side cemented with a double convex positive lens L22, and a double convex positive lens L23. With moving the cemented lens CL21 in the second lens group G2 along the optical axis, focusing from infinity to a nearest distance is carried out. In this manner, with constructing the imaging lens as an internal focusing system, burden on a focusing motor can be lightened, so that quick drive and power saving upon auto focus can be realized.

In the third lens group G3, a first negative lens component G3a is composed of a double concave negative lens L31, a second negative lens component G3b is composed of a negative meniscus lens L32 having a concave surface facing the first negative lens component G3a side, and a positive lens component G3c is composed of a cemented lens CL31 constructed by a double convex positive lens L33 cemented with a negative meniscus lens L34 having a concave surface facing the object side. With moving the third lens group G3 in a direction substantially perpendicular to the optical axis, image blur caused by a vibration of the imaging lens SL2 can be corrected (vibration reduction).

In the third lens group G3, the second negative lens component G3b side surface of the first negative lens component G3a has a concave surface facing the second negative lens component G3b side, and the second negative lens component G3b has a negative meniscus shape having a concave surface facing the first negative lens component G3a side. With this lens configuration, it becomes possible to excellently correct decentering coma and inclination of image plane generated upon moving the vibration reduction lens group in a direction substantially perpendicular to the optical axis.

Moreover, with constructing the positive lens component G3c to be the cemented lens CL31 whose cemented surface has a concave shape facing the aperture stop S, it becomes possible to correct chromatic curvature of field, in particular, chromatic curvature of field in the telephoto state. In the third lens group G3, which is the vibration reduction lens group, with disposing the positive lens component G3c having positive refractive power to the fourth lens group G4 side, it becomes possible to prevent the diameter of the fourth lens group G4 from getting larger, which is a typical issue for a super wide-angle zoom lens, without deteriorating vibration reduction performance.

The fourth lens group G4 is composed of, in order from the object side, a double convex positive lens L41, a cemented lens CL41 constructed by a negative meniscus lens L42 having a convex surface facing the object side cemented with a double convex positive lens L43, and a negative meniscus lens L44 having a concave surface facing the object side and an aspherical surface facing the image side.

Various values associated with the imaging lens SL2 according to Example 2 are listed in Table 2.

TABLE 2

[Specifications]

|  | W | M | T |
|---|---|---|---|
| f = | 17.50 | 24.00 | 38.79 |
| FNO = | 4.1 | 4.1 | 4.1 |
| 2ω = | 104° | 84° | 57°30' |
| IH = | 21.64 | 21.64 | 21.64 |
| TL = | 159.84 | 155.85 | 163.47 |

TABLE 2-continued

[Lens Data]

| i | r | d | nd | νd |
|---|---|---|---|---|
| *1 | 285.248 | 3.50 | 1.76684 | 46.82 |
| *2 | 20.074 | 11.76 | | |
| *3 | −269.558 | 0.25 | 1.55389 | 38.09 |
| 4 | −95.687 | 3.27 | 1.88187 | 40.79 |
| 5 | 35.217 | 0.80 | | |
| 6 | 33.379 | 9.22 | 1.69871 | 47.23 |
| 7 | 22.433 | 5.73 | 1.77318 | 28.06 |
| 8 | 276.442 | (d8) | | |
| 9 | 37.821 | 1.25 | 1.84666 | 23.78 |
| 10 | 19.478 | 5.37 | 1.58054 | 49.99 |
| 11 | −93.943 | 4.66 | | |
| 12 | 41.856 | 2.81 | 1.53389 | 61.70 |
| 13 | −107.463 | (d13) | | |
| 14 | ∞ | 2.20 | Aperture Stop S | |
| 15 | −198.716 | 1.00 | 1.87595 | 40.93 |
| 16 | 48.008 | 2.59 | | |
| 17 | −26.534 | 1.00 | 1.62877 | 43.36 |
| 18 | −100.404 | 0.15 | | |
| 19 | 110.984 | 4.29 | 1.84521 | 23.81 |
| 20 | −20.833 | 1.00 | 1.83412 | 32.29 |
| 21 | −92.619 | (d21) | | |
| 22 | 27.384 | 7.46 | 1.49782 | 82.51 |
| 23 | −81.909 | 0.13 | | |
| 24 | 57.701 | 1.00 | 1.86501 | 30.28 |
| 25 | 22.148 | 10.49 | 1.48749 | 70.40 |
| 26 | −31.702 | 2.32 | | |
| 27 | −24.258 | 1.30 | 1.86465 | 30.12 |
| *28 | −49.581 | (Bf) | | |

[Lens Group Data]

| Group | I | focal length |
|---|---|---|
| G1 | 1 | −21.16 |
| G2 | 9 | 33.02 |
| G3 | 14 | −46.91 |
| G4 | 22 | 46.76 |

[Aspherical Surface Data]

Surface Number: 1

κ = 109.078
A3 = 0.000E+00
A4 = 1.027E−05
A5 = 0.000E+00
A6 = −1.820E−08
A7 = 0.000E+00
A8 = 2.717E−11
A9 = 0.000E+00
A10 = −2.444E−14
A11 = 0.000E+00
A12 = 1.301E−17

Surface Number: 2

κ = 0.883
A3 = −5.384E−05
A4 = 5.585E−06
A5 = −1.386E−06
A6 = 5.799E−08
A7 = 4.592E−10
A8 = −1.131E−10
A9 = 0.000E+00
A10 = 0.000E+00
A11 = 0.000E+00
A12 = 0.000E+00

Surface Number: 3

κ = 185.041
A3 = 0.000E+00
A4 = −1.324E−05
A5 = 0.000E+00
A6 = 2.165E−08
A7 = 0.000E+00
A8 = −6.754E−11
A9 = 0.000E+00

TABLE 2-continued

A10 = −8.208E−16
A11 = 0.000E+00
A12 = 0.000E+00
Surface Number: 28

κ = 1.072
A3 = 2.375E−05
A4 = 4.763E−06
A5 = 5.589E−07
A6 = −3.429E−09
A7 = −1.344E−09
A8 = 1.100E−10
A9 = 0.000E+00
A10 = 0.000E+00
A11 = 0.000E+00
A12 = 0.000E+00

[Variable Distances]

|   | W | M | T |
|---|---|---|---|
| f | 17.51 | 24.00 | 38.79 |
| d8 | 22.34 | 11.38 | 1.04 |
| d13 | 1.00 | 5.47 | 12.50 |
| d21 | 14.50 | 10.03 | 3.00 |
| Bf | 38.44 | 45.41 | 63.38 |

[Values for Conditional Expressions]

Fg3 = −46.906
Fg3c = 59.015
(1)r1 = 48.008, r2 = −26.534
(2)Fa = 0.45
(3)Fb = 1.26

Figure 6A:
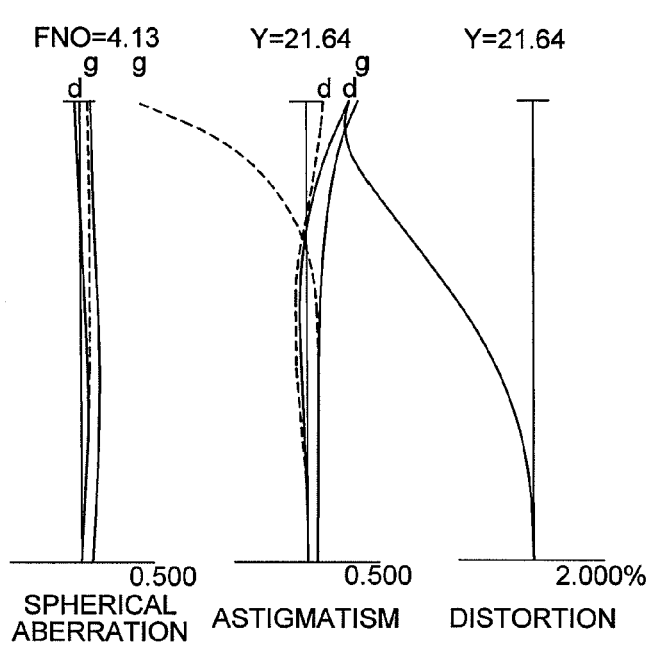
Figure 6B:
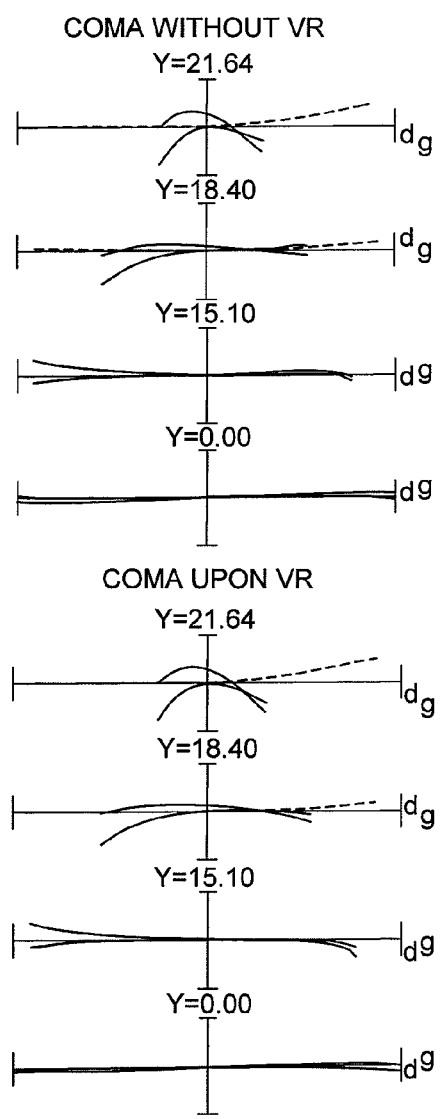
Figure 7A:
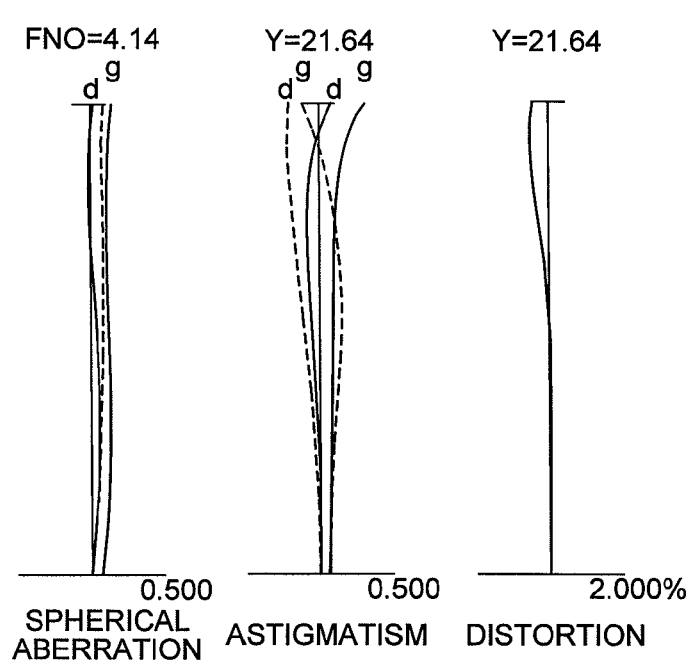
Figure 7B:
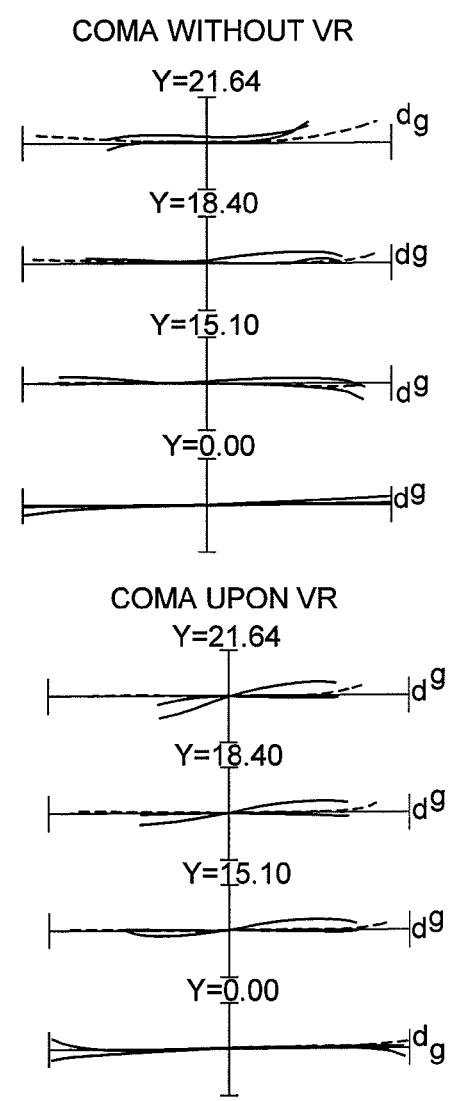
Figure 8A:
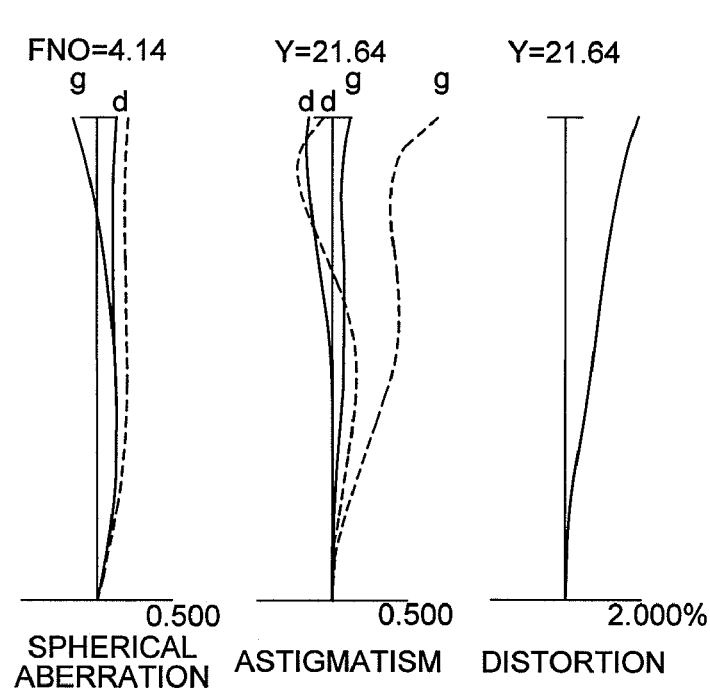
Figure 8B:
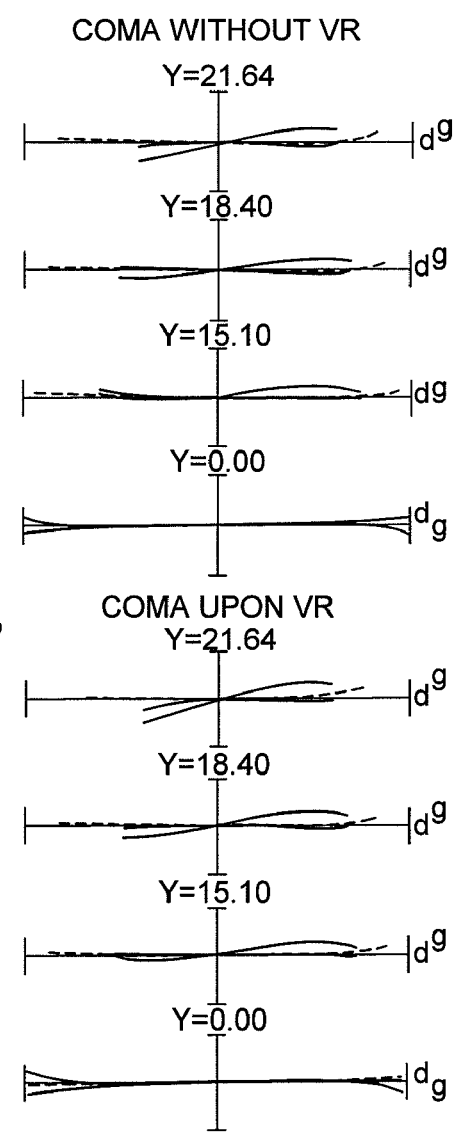

FIGS. 6A, and 6B are graphs showing various aberrations of the imaging lens according to Example 2 in a wide-angle end state focusing on infinity, in which FIG. 6A shows various aberrations without vibration reduction, and FIG. 6B shows coma upon carrying out vibration reduction. FIGS. 7A, and 7B are graphs showing various aberrations of the imaging lens according to Example 2 in an intermediate focal length state focusing on infinity, in which FIG. 7A shows various aberrations without vibration reduction, and FIG. 7B shows coma upon carrying out vibration reduction. FIGS. 8A, and 8B are graphs showing various aberrations of the imaging lens according to Example 2 in a telephoto end state focusing on infinity, in which FIG. 8A shows various aberrations without vibration reduction, and FIG. 8B shows coma upon carrying out vibration reduction.

As is apparent from the respective graphs, the imaging lens SL2 according to Example 2 shows superb optical performance as a result of good corrections to various aberrations in each focal length state from the wide-angle end state through the telephoto end state even upon carrying out vibration reduction. Moreover, Example 2 makes it possible to provide an imaging lens SL2 capable of zooming from a super wide-angle of view of 100 degrees or more to a standard angle of view of about 50 degrees, having high vibration reduction performance capable of excellently correcting aberrations upon vibration reduction, and having superb optical performance.

Example 3

FIG. 9 is a sectional view showing a lens configuration of an imaging lens SL3 according to Example 3. In the imaging lens SL3 shown in FIG. 9, a first lens group G1 is composed of, in order from an object side, a negative meniscus lens L11 having a convex surface facing the object side and aspherical surfaces on both sides thereof, a double concave negative lens L12 having an aspherical surface formed by a resin layer on the object side, and a cemented lens CL11 constructed by a negative meniscus lens L13 having a convex surface facing the object side cemented with a positive meniscus lens L14 having a convex surface facing the object side.

The second lens group G2 is composed of, in order from the object side, a cemented lens CL21 constructed by a negative meniscus lens L21 having a convex surface facing the object side cemented with a double convex positive lens L22, and a double convex positive lens L23. With moving the cemented lens CL21 in the second lens group G2 along the optical axis, focusing from infinity to a nearest distance is carried out. In this manner, with constructing the imaging lens as an internal focusing system, burden on a focusing motor can be lightened, so that quick drive and power saving upon auto focus can be realized.

A first negative lens component G3a in the third lens group G3 is constructed by a negative meniscus lens L31 having a convex surface facing the object side, a second negative lens component G3b is constructed by a negative meniscus lens L32 having a concave surface facing the first negative lens component G3a side, and a positive lens component G3c is constructed by a double convex positive lens L33.

With moving the third lens group G3 in a direction substantially perpendicular to the optical axis, image blur caused by a vibration of the imaging lens SL3 can be corrected (vibration reduction).

In the third lens group G3, the second negative lens component G3b side lens surface of the first negative lens component G3a has a concave surface facing the second negative lens component G3b side, and the second negative lens component G3b has a negative meniscus shape having a concave surface facing the first negative lens component G3a side. With this lens configuration, it becomes possible to excellently correct decentering coma and inclination of image plane generated upon moving the vibration reduction lens group in a direction substantially perpendicular to the optical axis.

Moreover, in the third lens group G3, which is the vibration reduction lens group, with disposing the positive lens component G3c having positive refractive power to the fourth lens group G4 side, it becomes possible to prevent the diameter of the fourth lens group G4 from getting larger, which is a typical issue for a super wide-angle zoom lens, without deteriorating vibration reduction performance.

The fourth lens group G4 is composed of, in order from the object side, a double convex positive lens L41, a cemented lens CL41 constructed by a negative meniscus lens L42 having a convex surface facing the object side cemented with a double convex positive lens L43, and a negative meniscus lens L44 having a concave surface facing the object side and an aspherical surface facing the image side.

Various values associated with the imaging lens SL3 according to Example 3 are listed in Table 3.

TABLE 3

[Specifications]

|   | W | M | T |
|---|---|---|---|
| f = | 17.51 | 24.00 | 38.80 |
| FNO = | 4.1 | 4.1 | 4.1 |
| 2ω = | 104° | 84° | 57°30' |
| IH = | 21.64 | 21.64 | 21.64 |
| TL = | 156.70 | 153.27 | 161.93 |

TABLE 3-continued

[Lens Data]

| i | r | d | nd | vd |
|---|---|---|---|---|
| *1 | 171.646 | 3.50 | 1.76684 | 46.80 |
| *2 | 19.739 | 12.50 | | |
| *3 | −539.637 | 0.25 | 1.55389 | 38.08 |
| 4 | −163.356 | 3.00 | 1.88183 | 40.58 |
| 5 | 60.741 | 0.61 | | |
| 6 | 78.448 | 4.82 | 1.74736 | 44.94 |
| 7 | 21.754 | 6.58 | 1.79075 | 26.83 |
| 8 | 362.657 | (d8) | | |
| 9 | 39.263 | 1.25 | 1.84767 | 24.10 |
| 10 | 20.304 | 4.64 | 1.56733 | 49.37 |
| 11 | −156.498 | 4.69 | | |
| 12 | 30.594 | 3.06 | 1.51340 | 65.05 |
| 13 | −150.945 | (d13) | | |
| 14 | ∞ | 1.87 | Aperture Stop S | |
| 15 | 455.200 | 1.36 | 1.86536 | 41.18 |
| 16 | 31.319 | 3.31 | | |
| 17 | −21.513 | 1.00 | 1.62874 | 51.57 |
| 18 | −103.940 | 0.17 | | |
| 19 | 117.993 | 2.85 | 1.84724 | 23.93 |
| 20 | −47.729 | (d20) | | |
| 21 | 29.259 | 7.81 | 1.49782 | 82.48 |
| 22 | −60.528 | 0.13 | | |
| 23 | 62.727 | 1.01 | 1.84875 | 33.25 |
| 24 | 26.012 | 11.02 | 1.48749 | 70.38 |
| 25 | −25.881 | 0.20 | | |
| 26 | −25.368 | 1.30 | 1.85026 | 32.33 |
| *27 | −71.523 | (Bf) | | |

[Lens Group Data]

| Group | I | focal length |
|---|---|---|
| G1 | 1 | −21.72 |
| G2 | 8 | 33.77 |
| G3 | 13 | −46.90 |
| G4 | 20 | 44.38 |

[Aspherical Surface Data]

Surface Number: 1

$\kappa = 19.790$
A3 = 0.000E+00
A4 = 8.222E−06
A5 = 0.000E+00
A6 = −1.784E−08
A7 = 0.000E+00
A8 = 2.418E−11
A9 = 0.000E+00
A10 = −2.173E−14
A11 = 0.000E+00
A12 = 1.172E−17
Surface Number: 2

$\kappa = 0.798$
A3 = −2.823E−06
A4 = 5.117E−07
A5 = −1.385E−06
A6 = 7.438E−08
A7 = 6.674E−10
A8 = −1.955E−10
A9 = 0.000E+00
A10 = 0.000E+00
A11 = 0.000E+00
A12 = 0.000E+00
Surface Number: 3

$\kappa = -0.170$
A3 = 5.009E−05
A4 = −1.583E−05
A5 = 2.001E−07
A6 = 3.670E−08
A7 = 2.625E−10
A8 = −1.999E−10
A9 = −1.307E−12
A10 = 2.751E−13

A11 = 0.000E+00
A12 = 0.000E+00
Surface Number: 27

$\kappa = -4.426$
A3 = 2.057E−05
A4 = 6.247E−06
A5 = 3.689E−07
A6 = −5.252E−09
A7 = −1.105E−10
A8 = 4.572E−11
A9 = 0.000E+00
A10 = 0.000E+00
A11 = 0.000E+00
A12 = 0.000E+00

[Variable Distances]

| | W | M | T |
|---|---|---|---|
| f | 17.51 | 24.00 | 38.80 |
| d8 | 22.26 | 11.66 | 1.59 |
| d13 | 1.00 | 5.59 | 12.67 |
| d20 | 14.53 | 9.95 | 2.87 |
| Bf | 41.98 | 49.15 | 67.87 |

[Values for Conditional Expressions]

Fg3 = −46.900
Fg3c = 40.428
(1)r1 = 31.319, r2 = −21.513
(2)Fa = 0.31
(3)Fb = 0.86

Figure 10A:
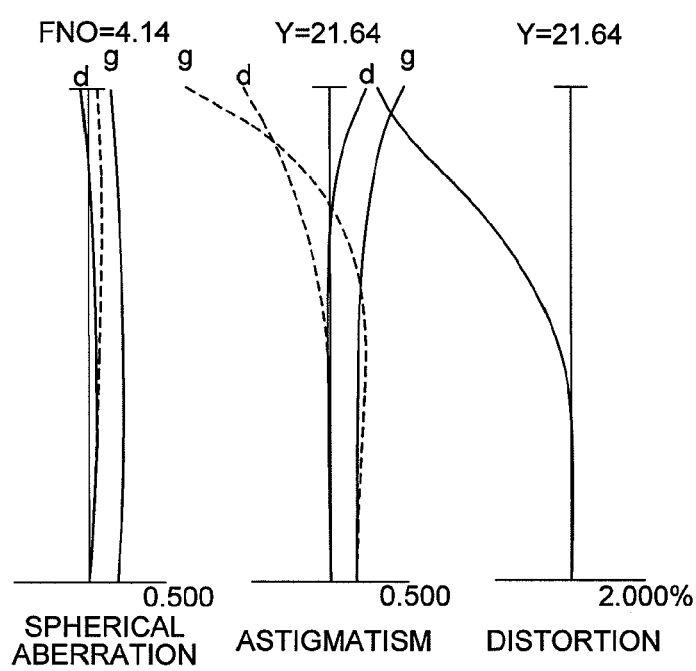
Figure 10B:
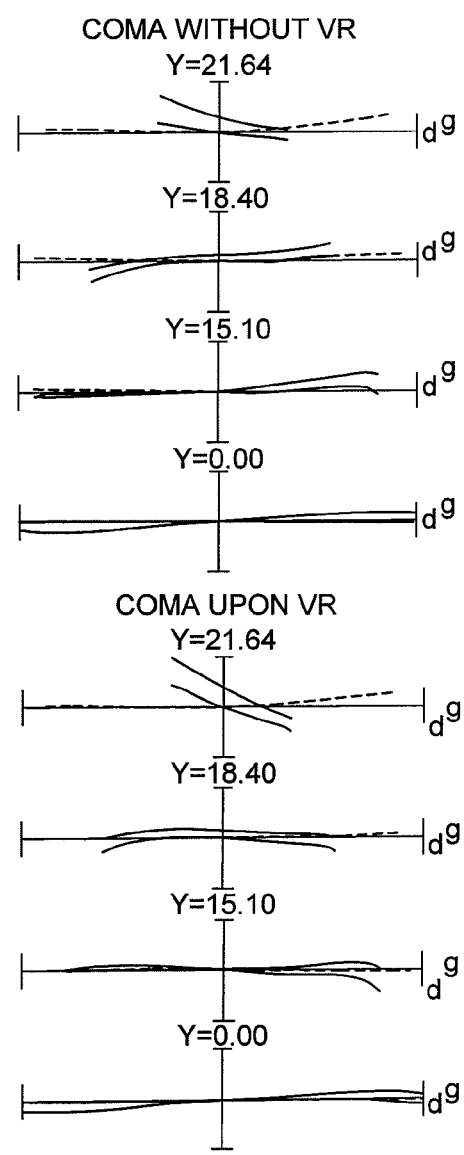
Figure 11A:
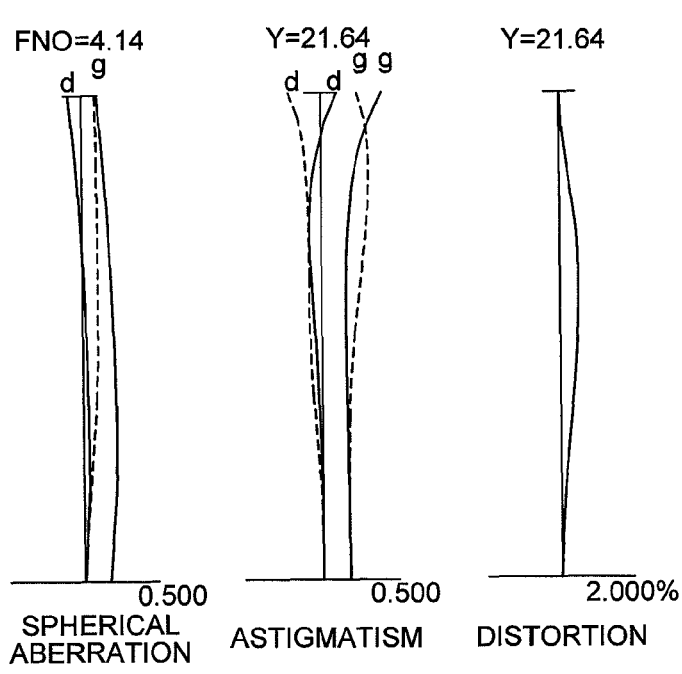
Figure 11B:
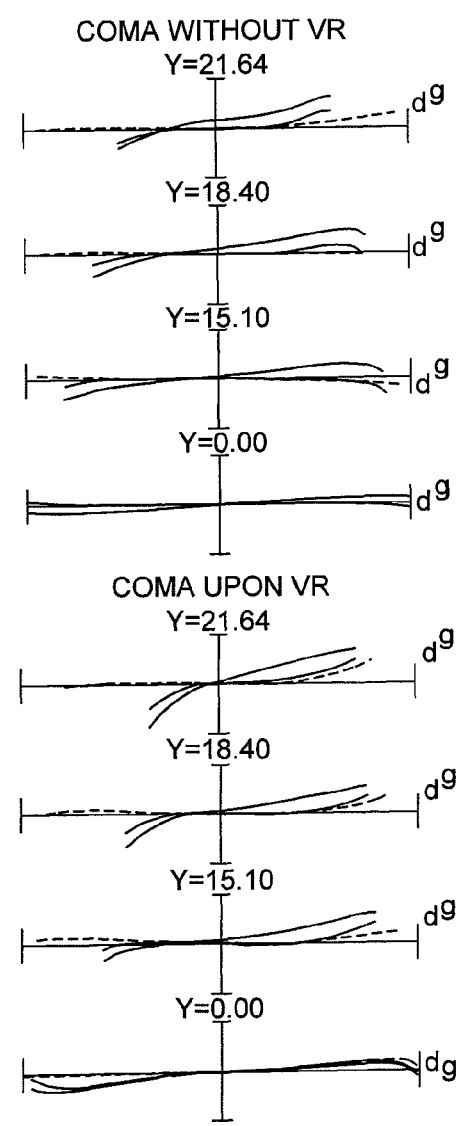
Figures 12A, 12B:
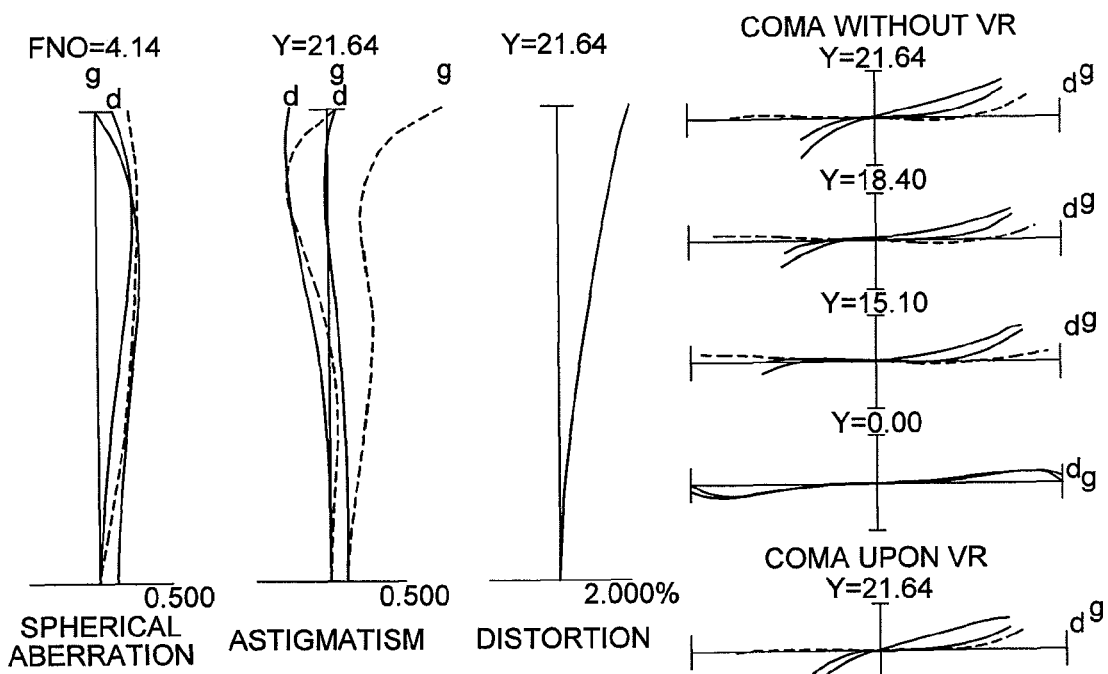

FIGS. 10A, and 10B are graphs showing various aberrations of the imaging lens according to Example 3 in a wide-angle end state focusing on infinity, in which FIG. 10A shows various aberrations without vibration reduction, and FIG. 10B shows coma upon carrying out vibration reduction. FIGS. 11A, and 11B are graphs showing various aberrations of the imaging lens according to Example 3 in an intermediate focal length state focusing on infinity, in which FIG. 11A shows various aberrations without vibration reduction, and FIG. 11B shows coma upon carrying out vibration reduction. FIGS. 12A, and 12B are graphs showing various aberrations of the imaging lens according to Example 3 in a telephoto end state focusing on infinity, in which FIG. 12A shows various aberrations without vibration reduction, and FIG. 12B shows coma upon carrying out vibration reduction.

As is apparent from the respective graphs, the imaging lens SL3 according to Example 3 shows superb optical performance as a result of good corrections to various aberrations in each focal length state from the wide-angle end state through the telephoto end state even upon carrying out vibration reduction. Moreover, Example 3 makes it possible to provide an imaging lens SL3 capable of zooming from a super wide-angle of view of 100 degrees or more to a standard angle of view of about 50 degrees, having high vibration reduction performance capable of excellently correcting aberrations upon vibration reduction, and having superb optical performance.

Example 4

FIG. 13 is a sectional view showing a lens configuration of an imaging lens SL4 according to Example 4 of the present application. The imaging lens SL4 according to Example 4 is a variation type of the imaging lens SL1 with a four-lens-group configuration according to Example 1. With dividing the second lens group G2 having positive refractive power of the imaging lens SL1 according to Example 1 into two that are made to be the second lens group G2 and the third lens group G3, the imaging lens SL4 has a negative-positive-positive-negative-positive five-lens-group configuration. In addition to this, with dividing the first lens group G1 having negative refractive power of the imaging lens SL1 according to Example 1 into two to be a first lens group G1 and a second lens group G2, the imaging lens may be a negative-negative-positive-negative-positive five-lens-group configuration.

In the imaging lens SL4 shown in FIG. 13, the first lens group G1 is composed of, in order from an object side, a negative meniscus lens L11 having a convex surface facing the object side and aspherical surfaces on both sides thereof, and a double concave negative lens L12, a double concave negative lens L13 having an aspherical surface formed on an image side thereof by a resin layer, and a double convex positive lens L14.

The second lens group G2 is composed of, in order from the object side, a cemented lens CL21 constructed by a negative meniscus lens L21 having a convex surface facing the object side cemented with a double convex positive lens L22. With moving the cemented lens CL21 in the second lens group G2 along an optical axis, focusing from infinity to a nearest distance is carried out. In this manner, with constructing the imaging lens as an internal focusing system, burden on a focusing motor can be lightened, so that quick drive and power saving upon auto focus can be realized.

The third lens group G3 is composed of a double convex positive lens L31.

In the fourth lens group G4, a first negative lens component G4a is composed of a cemented lens CL41 constructed by a positive meniscus lens L41 having a concave surface facing the object side cemented with a double concave negative lens L42. The second negative lens component G4b is composed of a negative meniscus lens L43 having a concave surface facing the first negative lens component G4a side. The positive lens component G4c is composed of a double convex positive lens L44. With moving the fourth lens group G4 in a direction substantially perpendicular to the optical axis, image blur caused by a vibration of the imaging lens SL4 can be corrected (vibration reduction).

Moreover, in the fourth lens group G4, the second negative lens component G4b side lens surface of the first negative lens component G4a is a concave surface facing the second negative lens component G4b side. The second negative lens component G4b has a negative meniscus shape having a concave surface facing the first negative lens component G4a side. With this lens configuration, it becomes possible to excellently correct decentering coma and inclination of image plane generated upon moving the vibration reduction lens group in a direction substantially perpendicular to the optical axis.

Furthermore, when the cemented lens CL41 whose cemented surface has a concave shape facing the aperture stop S side is made to be the first negative lens component G4a, chromatic curvature of field, in particular, chromatic curvature of field in the telephoto side can be corrected. In the fourth lens group G4 that is the vibration reduction lens group, with disposing the positive lens component G4c having positive refractive power to the fifth lens group G5 side, it becomes possible to prevent the diameter of the fifth lens group G5 from getting larger, which is a typical issue for a super wide-angle zoom lens, without deteriorating vibration reduction performance.

The fifth lens group G5 is composed of, in order from the object side, a triple-cemented lens CL51 constructed by a double convex positive lens L51 cemented with a double concave negative lens L52 cemented with a double convex positive lens L53, and a triple-cemented lens CL52 constructed by a negative meniscus lens L54 having a convex surface facing the object side cemented with a double convex positive lens L55 cemented with a negative meniscus lens L56 having a concave surface facing the object side and an aspherical surface facing the image side.

Various values associated with the imaging lens SL4 according to Example 4 is listed in Table 4. In [Aspherical Surface Data], aspherical coefficients A3, A5, A7, A9 and A11 are zero in Example 4. In [Values for Conditional Expressions], r1 denotes a radius of curvature of the second negative lens component G4b side surface of the first negative lens component G4a, r2 denotes a radius of curvature of the first negative lens component G4a side surface of the second negative lens component G4b, Fg3 denotes a focal length of the fourth lens group G4, Fg3c denotes a focal length of the positive lens component G4c, Fa denotes a variable shown by conditional expression (2), and Fb denotes a variable shown by conditional expression (3).

TABLE 4

[Specifications]

| | W | M | T |
|---|---|---|---|
| f = | 16.48 | 24.00 | 33.95 |
| FNO = | 4.1 | 4.1 | 4.1 |
| 2ω = | 108° | 84° | 63° |
| IH = | 21.64 | 21.64 | 21.64 |
| TL = | 168.08 | 160.27 | 163.75 |

[Lens Data]

| i | r | d | nd | νd |
|---|---|---|---|---|
| *1 | 62.094 | 3.00 | 1.76684 | 46.82 |
| *2 | 14.301 | 11.26 | | |
| 3 | −133.420 | 1.55 | 1.88300 | 40.76 |
| 4 | 227.977 | 2.78 | | |
| 5 | −61.001 | 1.50 | 1.88300 | 40.76 |
| 6 | 52.858 | 0.44 | 1.55389 | 38.09 |
| *7 | 96.032 | 1.50 | | |
| 8 | 41.480 | 6.14 | 1.69895 | 30.13 |
| 9 | −69.496 | (d9) | | |
| 10 | 35.662 | 1.05 | 1.84666 | 23.78 |
| 11 | 19.096 | 4.93 | 1.60342 | 38.01 |
| 12 | −115.677 | (d12) | | |
| 13 | 65.732 | 2.83 | 1.51823 | 58.93 |
| 14 | −65.732 | (d14) | | |
| 15 | ∞ | 3.22 | Aperture Stop S | |
| 16 | −144.424 | 2.12 | 1.70154 | 41.17 |
| 17 | −30.767 | 1.00 | 1.88300 | 40.76 |
| 18 | 36.062 | 2.71 | | |
| 19 | −24.016 | 0.80 | 1.88300 | 40.76 |
| 20 | −40.243 | 0.40 | | |
| 21 | 81.135 | 2.62 | 1.84666 | 23.78 |
| 22 | −57.748 | (d22) | | |
| 23 | 31.111 | 7.93 | 1.49782 | 82.51 |
| 24 | −39.591 | 1.10 | 1.83400 | 37.16 |
| 25 | 78.618 | 5.98 | 1.49782 | 82.51 |
| 26 | −44.322 | 0.15 | | |
| 27 | 39.175 | 1.10 | 1.88300 | 40.76 |
| 28 | 20.218 | 12.25 | 1.48749 | 70.40 |
| 29 | −45.139 | 1.60 | 1.80610 | 40.77 |
| *30 | −76.729 | (Bf) | | |

[Lens Group Data]

| Group | I | focal length |
|---|---|---|
| G1 | 1 | −21.43 |
| G2 | 10 | 61.95 |
| G3 | 13 | 63.89 |
| G4 | 15 | −46.90 |
| G5 | 23 | 50.49 |

TABLE 4-continued

[Aspherical Surface Data]

Surface Number: 1

κ = 1.000
A4 = −1.020E−05
A6 = 1.549E−08
A8 = −2.904E−12
A10 = −5.504E−15
A12 = 3.829E−18

Surface Number: 2

κ = 0.013
A4 = −6.833E−06
A6 = −4.836E−08
A8 = 1.534E−10
A10 = 0.000E+00
A12 = 0.000E+00

Surface Number: 7

κ = 5.374
A4 = 1.866E−05
A6 = 1.958E−08
A8 = −4.067E−11
A10 = 0.000E+00
A12 = 0.000E+00

Surface Number: 30

κ = 13.944
A4 = 1.097E−05
A6 = 1.562E−08
A8 = −4.875E−11
A10 = 1.846E−13
A12 = −3.267E−17

[Variable Distances]

|     | W     | M     | T     |
| --- | ----- | ----- | ----- |
| f   | 16.48 | 24.00 | 33.95 |
| d9  | 29.38 | 12.29 | 2.10  |
| d12 | 4.49  | 6.04  | 4.72  |
| d14 | 3.17  | 6.27  | 8.65  |
| d22 | 12.50 | 5.44  | 1.25  |
| Bf  | 38.57 | 50.25 | 67.06 |

[Values for Conditional Expressions]

Fg3 = −46.898
Fg3c = 40.194
(1)r1 = 36.062, r2 = −24.016
(2)Fa = 0.33
(3)Fb = 0.86

Figures 14A, 14B:
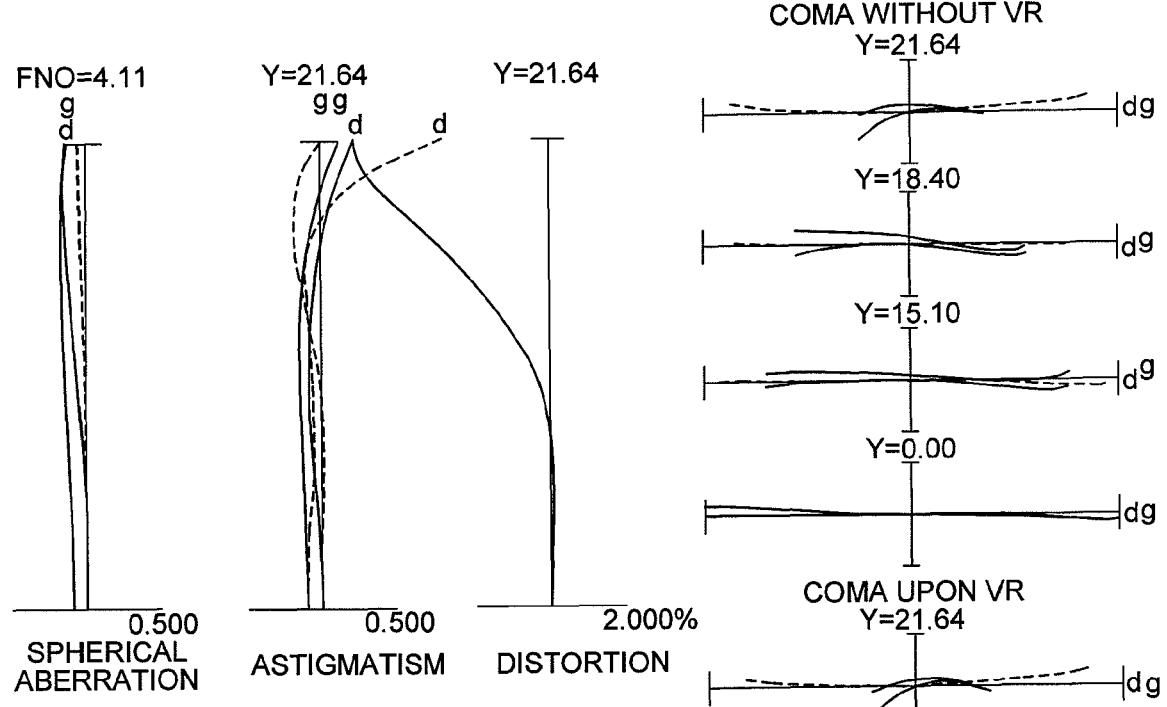
Figure 16A:
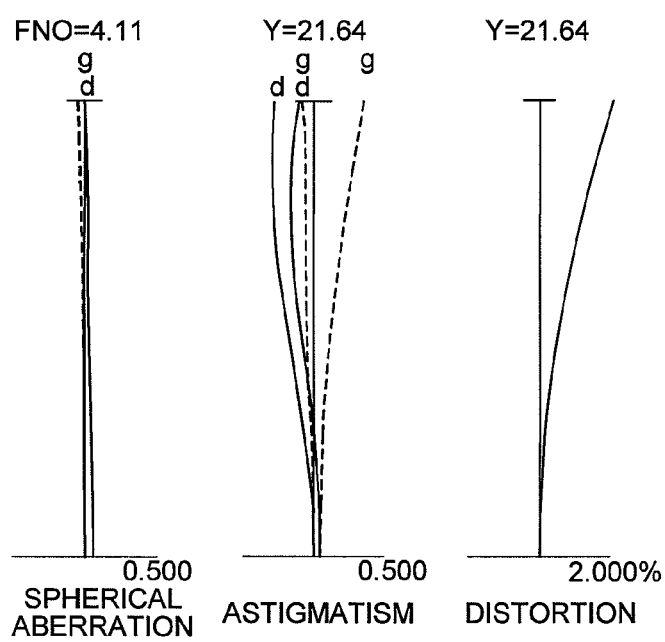
Figure 16B:
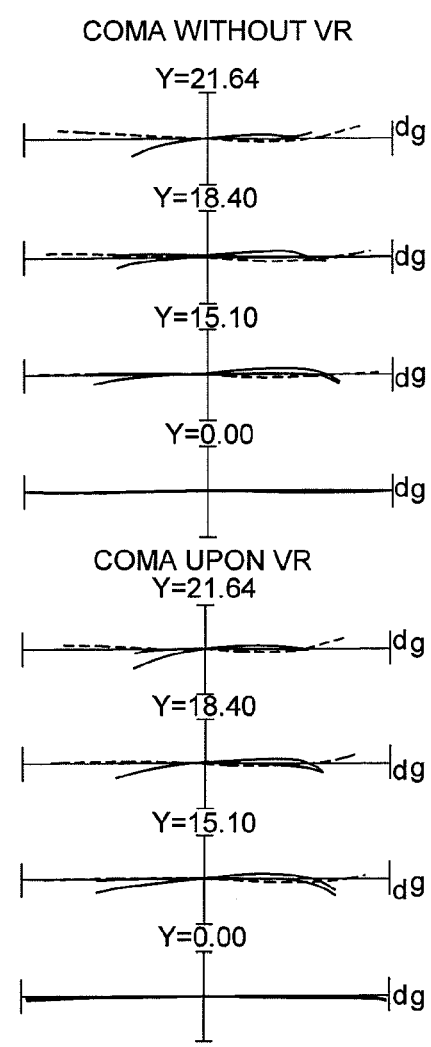

FIGS. 14A, and 14B are graphs showing various aberrations of the imaging lens according to Example 4 in a wide-angle end state focusing on infinity, in which FIG. 14A shows various aberrations without vibration reduction, and FIG. 14B shows coma upon carrying out vibration reduction. FIGS. 15A, and 15B are graphs showing various aberrations of the imaging lens according to Example 4 in an intermediate focal length state focusing on infinity, in which FIG. 15A shows various aberrations without vibration reduction, and FIG. 15B shows coma upon carrying out vibration reduction. FIGS. 16A, and 16B are graphs showing various aberrations of the imaging lens according to Example 4 in a telephoto end state focusing on infinity, in which FIG. 16A shows various aberrations without vibration reduction, and FIG. 16B shows coma upon carrying out vibration reduction.

As is apparent from the respective graphs, the imaging lens SL4 according to Example 4 shows superb optical performance as a result of good corrections to various aberrations in each focal length state from the wide-angle end state through the telephoto end state even upon carrying out vibration reduction. Moreover, Example 4 makes it possible to provide an imaging lens SL4 capable of zooming from a super wide-angle of view of 100 degrees or more to a standard angle of view of about 50 degrees, having high vibration reduction performance capable of excellently correcting aberrations upon vibration reduction, and having superb optical performance.

Incidentally, the following description may suitably be applied within limits that do not deteriorate optical performance.

In the present embodiment, although the lens system is composed of four movable lens groups, another lens group may be added between respective lens groups, or another lens group may be added adjacent to object side or image side of the lens system.

In the present embodiment, although an imaging lens SL with a four-lens-group configuration is shown, the above-described conditions can be applied to a five-lens-group configuration and a six-lens-group configuration. Moreover, a lens configuration in which a lens or a lens group is added to the most object side thereof, or a lens configuration in which a lens or a lens group is added to the most image side thereof may be possible. Incidentally, a lens group is defined as a portion having at least one lens that is separated by an air space that varies upon zooming. A lens component indicates a single lens or a cemented lens in which a plurality of lenses are cemented with each other.

As shown in FIG. 13, an imaging lens SL according to the present embodiment may be composed of, in order from an object side, a first lens group G1 having negative refractive power as a front lens group, a second lens group G2 having positive refractive power, a third lens group G3 having positive refractive power, a fourth lens group G4 having negative refractive power as a rear lens group, and a fifth lens group G5 having positive refractive power. In this case, the fourth lens group G4 is composed of a first negative lens component G4a, a second negative lens component G4b having negative refractive power and a positive lens component G4c having positive refractive power. In an imaging lens SL, upon zooming from a wide-angle end state to a telephoto end state, each lens group moves together along the optical axis and each distance between lens groups varies such that a distance between the first lens group G1 and the second lens group G2 decreases, a distance between the second lens group G2 and the third lens group G3 varies, a distance between the third lens group G3 and the fourth lens group G4 increases, and a distance between the fourth lens group G4 and the fifth lens group G5 decreases. With configuring in this manner, it becomes possible to increase degree of freedom of optical design and to obtain excellent optical performance.

Furthermore, an imaging lens SL according to the present embodiment may be composed of, in order from an object side, a first lens group G1 having negative refractive power as a front lens group, a second lens group G2 having negative refractive power, a third lens group G3 having positive refractive power, a fourth lens group G4 having negative refractive power as a rear lens group, and a fifth lens group G5 having positive refractive power.

In order to vary focusing from infinity to a close object, a portion of a lens group, a single lens group, or a plurality of lens groups may be moved along the optical axis as a focusing lens group. In this case, the focusing lens group can be used for auto focus, and suitable for being driven by a motor such as an ultrasonic motor. It is particularly preferable that at least a portion or whole of the second lens group is used as the focusing lens group.

Moreover, any lens surface may be formed as a spherical surface, a plane surface or an aspherical surface. When a lens surface is a spherical surface or a plane surface, processing and assembly become easy, so that deterioration of optical performance caused by errors upon processing and assembling can be prevented. Even if the lens surface is shifted, deterioration in optical performance is small, so that it is desirable. When the lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

Although an aperture stop S is preferably disposed in the vicinity of the third lens group G3, which is a rear lens group, the function may be substituted by a lens frame without disposing a member as an aperture stop.

An antireflection coating having high transmittance over a broad wavelength range may be applied to each lens surface to reduce flare or ghost images, so that high optical performance with a high contrast can be attained.

In an imaging lens SL according to the present embodiment, the first lens group G1 preferably includes one positive lens component and two or three negative lens components. The first lens group preferably disposes lens components, in order from an object side, negative-negative-positive or negative-negative-negative-positive with an air space in between. Alternatively, the negative lens and the positive lens may be cemented with each other to be a cemented lens.

In an imaging lens SL according to the present embodiment, the second lens group G2 preferably includes two positive lens components and one negative lens component. The second lens group G2 preferably disposes lens components, in order from the object side, negative-positive-positive. The second lens group G2 is preferably composed of one cemented lens constructed by a negative lens cemented with a positive lens, and a single lens having positive refractive power.

In an imaging lens SL according to the present embodiment, the third lens group G3 preferably includes one positive lens component and two negative lens components. The third lens group G3 disposes lens components, in order from the object side, negative-negative-positive with an air space in between. In the third lens group G3, it is preferable that one lens component is a cemented lens, and two lens components are single lenses.

In an imaging lens SL according to the present embodiment, although the zoom ratio is about 2 to 2.5, the imaging lens may be a single-focal-length lens whose focal length does not vary. An angle of view is preferably 100 degrees or more in the wide-angle end state, and about 50 degrees in the telephoto end state.

The present embodiment only shows a specific example for the purpose of better understanding of the present invention. Accordingly, it is needless to say that the invention in its broader aspect is not limited to the specific details and representative devices.

What is claimed is:

1. An imaging lens comprising:
    a front lens group that is disposed to the most object side and has negative refractive power;
    a rear lens group that is disposed to an image side of the front lens group and has negative refractive power;
    wherein at least a portion of the rear lens group is movable in a direction including a component substantially perpendicular to an optical axis,
    the rear lens group including a first negative lens component having negative refractive power, a second negative lens component having negative refractive power, and a positive lens component having positive refractive power,
    the second negative lens component being disposed between the first negative lens component and the positive lens component,
    the second negative lens component side lens surface of the first negative lens component being formed to be a concave shape facing the second negative lens component side, and
    the second negative lens component having a negative meniscus shape with a concave surface facing the first negative lens component side.

2. The imaging lens according to claim 1, wherein an aperture stop is disposed in the vicinity of the rear lens group, and the rear lens group is composed of, in order from the aperture stop side, the first negative lens component, the second negative lens component, and the positive lens component.

3. The imaging lens according to claim 1, wherein the positive lens component has a double convex shape.

4. The imaging lens according to claim 1, wherein at least one of the first negative lens component, the second negative lens component and the positive lens component is a cemented lens constructed by a negative lens cemented with a positive lens.

5. The imaging lens according to claim 4, wherein a cemented surface of the cemented lens has a concave surface facing an aperture stop side.

6. The imaging lens according to claim 1, further comprising:
    a second lens group that has positive refractive power and is disposed between the first lens group which is the front lens group and the third lens group which is the rear lens group; and
    a fourth lens group that has positive refractive power and is disposed to the image side of the third lens group;
    wherein upon zooming from a wide-angle end state to a telephoto end state, a distance between the first lens group and the second lens group varies, a distance between the second lens group and the third lens group varies, and a distance between the third lens group and the fourth lens group varies.

7. The imaging lens according to claim 6, wherein upon zooming from a wide-angle end state to a telephoto end state, the distance between the first lens group and the second lens group decreases, the distance between the second lens group and the third lens group increases, and the distance between the third lens group and the fourth lens group decreases.

8. An optical apparatus equipped with the imaging lens according to claim 1 for forming an image of an object on a predetermined image plane.

9. A method for manufacturing an imaging lens that includes a front lens group having negative refractive power and a rear lens group having negative refractive power, the method comprising the steps of:
    disposing the front lens group to the most object side;
    disposing the rear lens group to an image side of the front lens group;
    disposing a first negative lens component having negative refractive power, a second negative lens component having a negative meniscus shape with negative refractive power, and a positive lens component having positive refractive power into the rear lens group such that the second negative lens component is disposed between the first negative lens component and the positive lens component, and a shape of an air lens between the first negative lens component and the second negative lens component is a double convex shape; and disposing at least a portion of the rear lens group movable in a direction including a component substantially perpendicular to an optical axis.

* * * * *